(12) United States Patent
Lee et al.

(10) Patent No.: US 11,641,294 B2
(45) Date of Patent: May 2, 2023

(54) C-PHY HALF-RATE WIRE STATE ENCODER AND DECODER

(71) Applicant: QUALCOMM Incorporated, San Diego, CA (US)

(72) Inventors: Chulkyu Lee, San Diego, CA (US); Ying Duan, San Diego, CA (US); Shih-Wei Chou, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/589,083

(22) Filed: Jan. 31, 2022

(65) Prior Publication Data

US 2022/0158879 A1    May 19, 2022

Related U.S. Application Data

(63) Continuation of application No. 17/070,219, filed on Oct. 14, 2020, now Pat. No. 11,240,077.

(Continued)

(51) Int. Cl.
*H04L 25/49* (2006.01)
*H04L 25/493* (2006.01)
(Continued)

(52) U.S. Cl.
CPC ........ *H04L 25/4917* (2013.01); *H04L 7/0008* (2013.01); *H04L 7/0037* (2013.01);
(Continued)

(58) Field of Classification Search
CPC ............. G06F 13/4291; H04L 25/0272; H04L 25/028; H04L 25/14; H04L 25/4917; H04L 25/493; H04L 7/0008; H04L 7/0037

See application file for complete search history.

(56) References Cited

U.S. PATENT DOCUMENTS

| 9,485,080 | B1 | 11/2016 | Duan et al. |
| 9,520,988 | B1 | 12/2016 | Wiley et al. |
| 10,289,600 | B2 | 5/2019 | Sejpal et al. |

(Continued)

FOREIGN PATENT DOCUMENTS

| KR | 20220025226 A | 3/2022 |
| WO | 2017023498 A1 | 2/2017 |

(Continued)

OTHER PUBLICATIONS

International Search Report and Written Opinion—PCT/US2020/055804—ISA/EPO—dated Feb. 15, 2021.

*Primary Examiner* — Nader Bolourchi
(74) *Attorney, Agent, or Firm* — Loza & Loza, LLP

(57) ABSTRACT

Methods, apparatus, and systems provide improved throughput on a communication link. An apparatus has a plurality of line drivers, a first wire state encoder configured to receive a first symbol in a sequence of symbols when a 3-wire link is in a first signaling state, and to define a second signaling state for the 3-wire link based on the first symbol and the first signaling state, a second wire state encoder configured to receive a second symbol in the sequence of symbols, and to define a third signaling state for the 3-wire link based on the second symbol and the second signaling state. The first symbol immediately precedes the second symbol in the sequence of symbols. The 3-wire link transitions from the first to the second signaling state, and from the second to the third signaling state in consecutive transmission intervals.

20 Claims, 21 Drawing Sheets

Related U.S. Application Data

(60) Provisional application No. 62/927,524, filed on Oct. 29, 2019.

(51) Int. Cl.
  *H04L 7/00* (2006.01)
  *H04L 25/14* (2006.01)
  *H04L 25/02* (2006.01)

(52) U.S. Cl.
  CPC ............ *H04L 25/028* (2013.01); *H04L 25/14* (2013.01); *H04L 25/493* (2013.01)

(56) References Cited

U.S. PATENT DOCUMENTS

| | | |
|---|---|---|
| 10,419,246 B2 | 9/2019 | Duan et al. |
| 10,454,725 B1 | 10/2019 | Lee et al. |
| 11,240,077 B2 | 2/2022 | Lee et al. |
| 2010/0235673 A1 | 9/2010 | Abbasfar |
| 2017/0026083 A1 | 1/2017 | Sejpal et al. |
| 2018/0131503 A1 | 5/2018 | Duan et al. |

FOREIGN PATENT DOCUMENTS

| | | |
|---|---|---|
| WO | 2018081010 A1 | 5/2018 |
| WO | 2018159304 A1 | 9/2018 |

C-PHY HALF-RATE WIRE STATE ENCODER AND DECODER

PRIORITY

This application is a continuation of U.S. patent application Ser. No. 17/070,219 filed in the U.S. Patent Office on Oct. 14, 2020, which claimed priority to and the benefit of U.S. Provisional Patent Application Ser. No. 62/927,524 filed in the U.S. Patent Office on Oct. 29, 2019, the entire content of these applications being incorporated herein by reference as if fully set forth below in their entirety and for all applicable purposes.

TECHNICAL FIELD

The present disclosure relates generally to high-speed data communication interfaces, and more particularly, to improving data throughput over a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

A multiphase three-wire (C-PHY) interface defined by the MIPI Alliance uses a trio of conductors to transmit information between devices. Each of the three wires may be in one of three signaling states during transmission of a symbol over the C-PHY interface. Clock information is encoded in a sequence of symbols transmitted on the C-PHY interface and a receiver generates a clock signal from transitions between consecutive symbols. The maximum speed of the C-PHY interface and the ability of a clock and data recovery (CDR) circuit to recover clock information may be limited by the maximum time variation related to transitions of signals transmitted on the different wires of the communication link, which can limit the number of symbols transmitted per second. The continual increase in services and performance provided by mobile devices has resulted in an ongoing demand for increased data throughput on multiphase, multi-wire interfaces.

SUMMARY

Certain embodiments disclosed herein provide systems, methods and apparatus that enable improved communication on a multi-wire and/or multiphase communication link through improved encoding techniques and protocol. In some embodiments, data throughput is improved by increasing the symbol clock rate used on the communication link. The communication link may be deployed in apparatus such as a mobile terminal having multiple Integrated Circuit (IC) devices.

In various aspects of the disclosure, a data communication apparatus has a plurality of line drivers configured to couple the apparatus to a 3-wire link, a first wire state encoder configured to receive a first symbol in a sequence of symbols when the 3-wire link is in a first signaling state, and to define a second signaling state for the 3-wire link based on the first symbol and the first signaling state, a second wire state encoder configured to receive a second symbol in the sequence of symbols, and to define a third signaling state for the 3-wire link based on the second symbol and the second signaling state. The first symbol immediately precedes the second symbol in the sequence of symbols. The 3-wire link transitions from the first signaling state to the second signaling state and from the second signaling state to the third signaling state in consecutive symbol transmission intervals. The signaling states of at least one wire in the 3-wire link changes when the 3-wire link transitions from the second signaling state to the third signaling state.

In one aspect, each of the first wire state encoder and the second wire state encoder defines signaling states for the 3-wire link every two symbol transmission intervals.

In certain aspects, the apparatus includes a clock generation circuit configured to provide a half-rate symbol clock signal that has a period twice the duration of each symbol transmission interval. The apparatus may have a driver control circuit configured to control the plurality of line drivers, and a multiplexer that selects between the second signaling state and the third signaling state to provide wire state information to the driver control circuit. The multiplexer may select between the second signaling state and the third signaling state based on phase of the half-rate symbol clock signal. The apparatus may have first plurality of flipflops clocked by an inverse of the half-rate symbol clock signal and configured to capture first control signals representative of the second signaling state, second plurality of flipflops clocked by the half-rate symbol clock signal and configured to capture second control signals representative of the third signaling state. The multiplexer may be further configured to provide the first control signals or the second control signals as the wire state information.

In one aspect, the apparatus has one or more mappers configured to map at least 16 bits of data to at least 7 symbols in the sequence of symbols. The 3-wire link may be operated in accordance with a C-PHY protocol.

In one aspect, the apparatus has an equalizer circuit configured to receive delayed versions of the second signaling state and the third signaling state, and to configure the plurality of line drivers when initiating transmission of the third signaling state based on differences between the second signaling state and the third signaling state.

In various aspects of the disclosure, a data communication method includes configuring a plurality of line drivers to couple the apparatus to a 3-wire link, receiving a first symbol in a sequence of symbols at a first wire state encoder when the 3-wire link is in a first signaling state, defining a second signaling state for the 3-wire link based on the first symbol and the first signaling state, receiving a second symbol in the sequence of symbols at a second wire state encoder, and defining a third signaling state for the 3-wire link based on the second symbol and the second signaling state. The first symbol immediately precedes the second symbol in the sequence of symbols. The 3-wire link transitions from the first signaling state to the second signaling state and from the second signaling state to the third signaling state in consecutive symbol transmission intervals. Signaling state of at least one wire in the 3-wire link changes when the 3-wire link transitions from the second signaling state to the third signaling state.

In various aspects of the disclosure, a processor-readable storage medium includes code for configuring a plurality of line drivers to couple the apparatus to a 3-wire link, receiving a first symbol in a sequence of symbols at a first wire state encoder when the 3-wire link is in a first signaling state, defining a second signaling state for the 3-wire link based on the first symbol and the first signaling state, receiving a second symbol in the sequence of symbols at a second wire state encoder, and defining a third signaling state for the 3-wire link based on the second symbol and the second signaling state. The first symbol immediately precedes the second symbol in the sequence of symbols. The 3-wire link transitions from the first signaling state to the second signaling state and from the second signaling state to the third signaling state in consecutive symbol transmission intervals. Signaling states of at least one wire in the 3-wire link changes when the 3-wire link transitions from the second signaling state to the third signaling state.

In various aspects of the disclosure, a data communication apparatus, has a plurality of receivers configured to provide difference signals representative of differences in signaling state between each pair of wires in a 3-wire link, a first wire state decoder configured to provide a first symbol based on differences between state of the difference signals in a first half-cycle of a symbol clock and state of the difference signals in a second half-cycle of the symbol clock that immediately precedes the first half-cycle in the symbol clock, a second wire state decoder configured to provide a second symbol based on differences between the state of the difference signals in the second half-cycle of the symbol clock and state of the difference signals in a third half-cycle of the symbol clock that immediately precedes the second half-cycle in the symbol clock, and a demapper configured to decode data from a sequence of symbols that includes the first symbol and the second symbol. The first symbol immediately precedes the second symbol in the sequence of symbols.

In some aspects, signaling state of at least one difference signal changes at each transition between half-cycles of the half-rate symbol clock. The apparatus may include a clock recovery circuit configured to derive the symbol clock from the difference signals.

In certain aspects, the apparatus includes a plurality of difference signal processors. Each difference signal processor is coupled to an associated difference signal. Each difference signal processor may be configured to provide a first signal representing the state of the corresponding difference signal in the first half-cycle of the symbol clock, a second signal representing the state of the corresponding difference signal in the second half-cycle of the symbol clock, and a third signal representing the state of the corresponding difference signal in the third half-cycle of the symbol clock.

In one aspect, the demapper is further configured to decode a 16-bit word from each of a plurality of sequences of seven symbols or decode a 32-bit word from each pair of sequences of seven symbols generated concurrently by the first wire state decoder and the second wire state decoder. The 3-wire link may be operated in accordance with a C-PHY protocol.

In various aspects of the disclosure, a data communication method includes providing difference signals representative of differences in signaling state between each pair of wires in a 3-wire link, providing a first symbol based on differences between state of the difference signals in a first half-cycle of a symbol clock and state of the difference signals in a second half-cycle of the symbol clock that immediately precedes the first half-cycle in the symbol clock, providing a second symbol based on differences between the state of the difference signals in the second half-cycle of the symbol clock and state of the difference signals in a third half-cycle of the symbol clock that immediately precedes the second half-cycle in the symbol clock, and decoding data from a sequence of symbols that includes the first symbol and the second symbol. The first symbol may immediately precede the second symbol in the sequence of symbols.

In various aspects of the disclosure, includes code for providing difference signals representative of differences in signaling state between each pair of wires in a 3-wire link, providing a first symbol based on differences between state of the difference signals in a first half-cycle of a symbol clock and state of the difference signals in a second half-cycle of the symbol clock that immediately precedes the first half-cycle in the symbol clock, providing a second symbol based on differences between the state of the difference signals in the second half-cycle of the symbol clock and state of the difference signals in a third half-cycle of the symbol clock that immediately precedes the second half-cycle in the symbol clock, and decoding data from a sequence of symbols that includes the first symbol and the second symbol. The first symbol may immediately precede the second symbol in the sequence of symbols.

DETAILED DESCRIPTION

Figure 1:
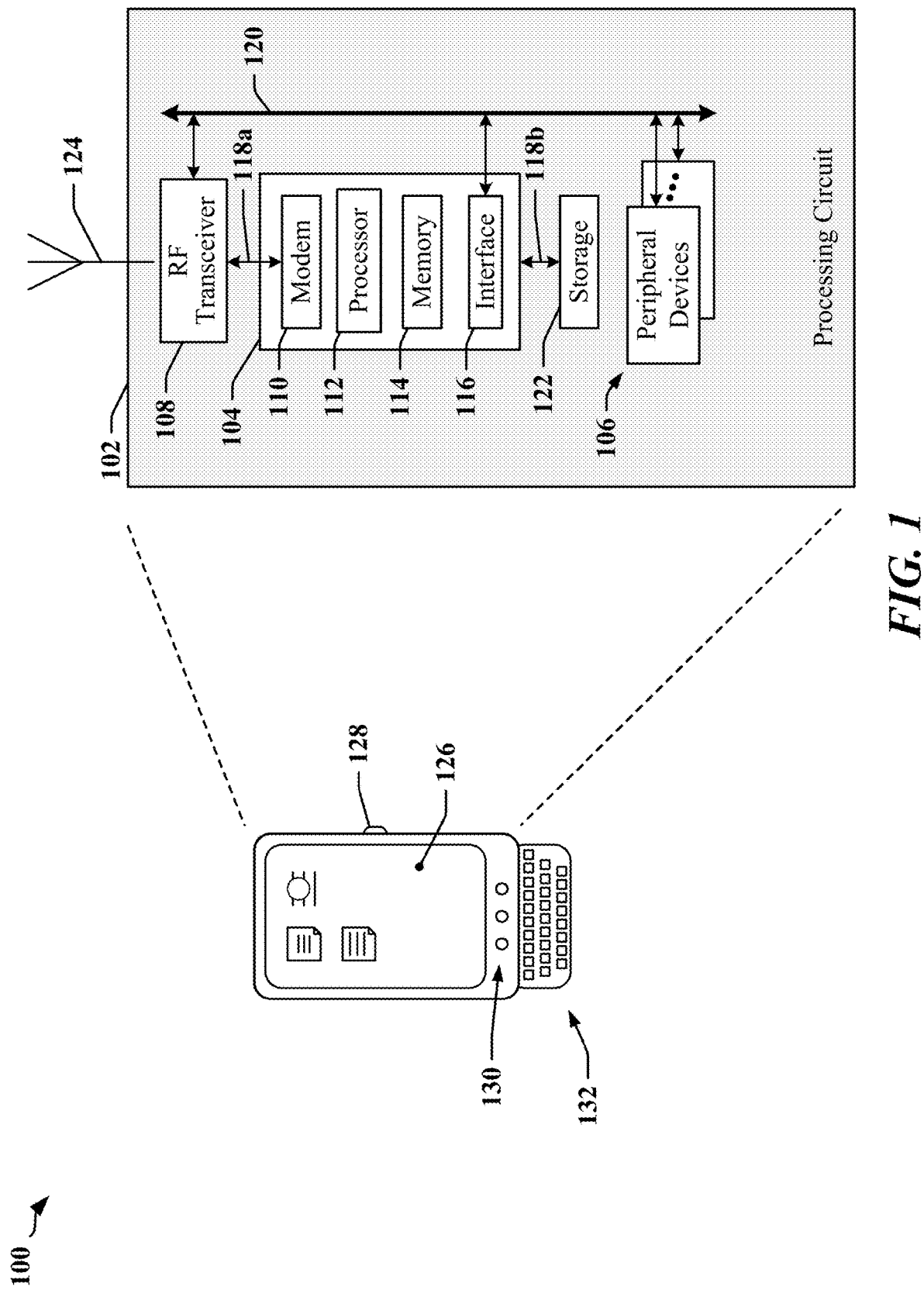
FIG. 1 depicts an apparatus employing a data link between IC devices that is selectively operated according to one of a plurality of available standards or protocols, which may include a C-PHY protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various processor-readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to improving a C-PHY interface specified by the MIPI Alliance, which is often deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

Certain aspects disclosed herein enable devices to communicate at higher data rates over a three-wire communication link than possible using conventional C-PHY symbol rates. In various aspects of the disclosure, a data communication apparatus has a plurality of line drivers configured to couple the apparatus to a 3-wire link, and a data encoder configured to encode at least 4 bits of binary data in each transition between two symbols that are consecutively transmitted by the plurality of line drivers over the 3-wire link such that each pair of consecutively-transmitted symbols includes two different symbols. Each symbol defines signaling states of the 3-wire link during an associated symbol transmission interval such that each wire of the 3-wire link is in a different signaling state from the other wires of the of the 3-wire link during the associated symbol transmission interval. Data may be encoded using a combination of 3-phase and pulse amplitude modulation. The apparatus may include a wire state encoder configured to receive a sequence of symbols from the data encoder, and provide control signals to the plurality of line drivers. The control signals cause each of the plurality of line drivers to drive one wire of the 3-wire link to a signaling state defined by each symbol during a symbol transmission interval provided for each symbol in the sequence of symbols.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or as a trio of wires. The three-phase signal is transmitted on each wire of the trio in different phases. Each three-wire trio provides a lane on a communication link. A symbol interval may be defined as the interval of time in which a single symbol controls the signaling state of a trio. In each symbol interval, one wire is undriven or is driven to an intermediate voltage state while the remaining two of the three wires are differentially driven such that one of the two differentially driven wires assumes a first voltage level and the other differentially driven wire assumes to a second voltage level different from the first voltage level. The undriven wire may float, and/or be terminated such that it assumes a third voltage level that is at or near the intermediate voltage level, which may be a mid-level voltage level between the first and second voltage levels. In one example, the driven voltage levels may be +V and −V with the third voltage being 0 Volts. In another example, the driven voltage levels may be +V and 0 Volts with the undriven voltage being +V/2. Different symbols are transmitted in each consecutively transmitted pair of symbols, and different pairs of wires may be differentially driven in different symbol intervals.

FIG. 1 depicts an example of apparatus 100 that may employ C-PHY 3-phase protocols to implement one or more communication links. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
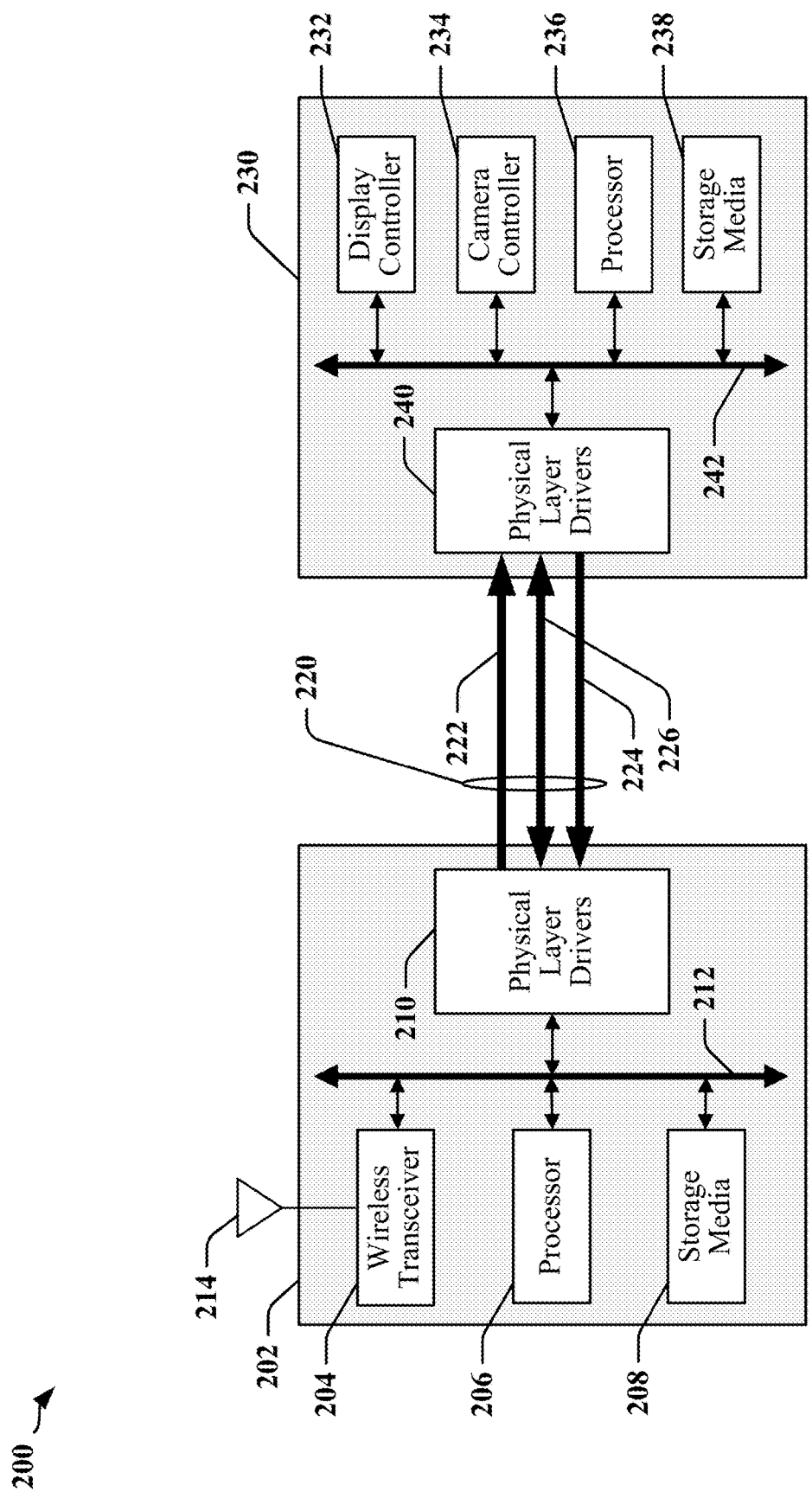
FIG. 2 illustrates a system architecture for an apparatus employing a data link between IC devices that selectively operates according to one of plurality of available standards.

FIG. 2 illustrates certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor 206, 236 or other processing and/or computing circuit or device. In one example, the first IC device 202 may perform core functions of the apparatus 200, including establishing and maintaining wireless communication through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222, and the forward channel 222 and the reverse channel 224 may be capable of transmitting at comparable speeds or at different speeds, where speed may be expressed as data transfer rate, symbol transmission rate and/or clocking rates. The forward and reverse data rates may be substantially the same or may differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
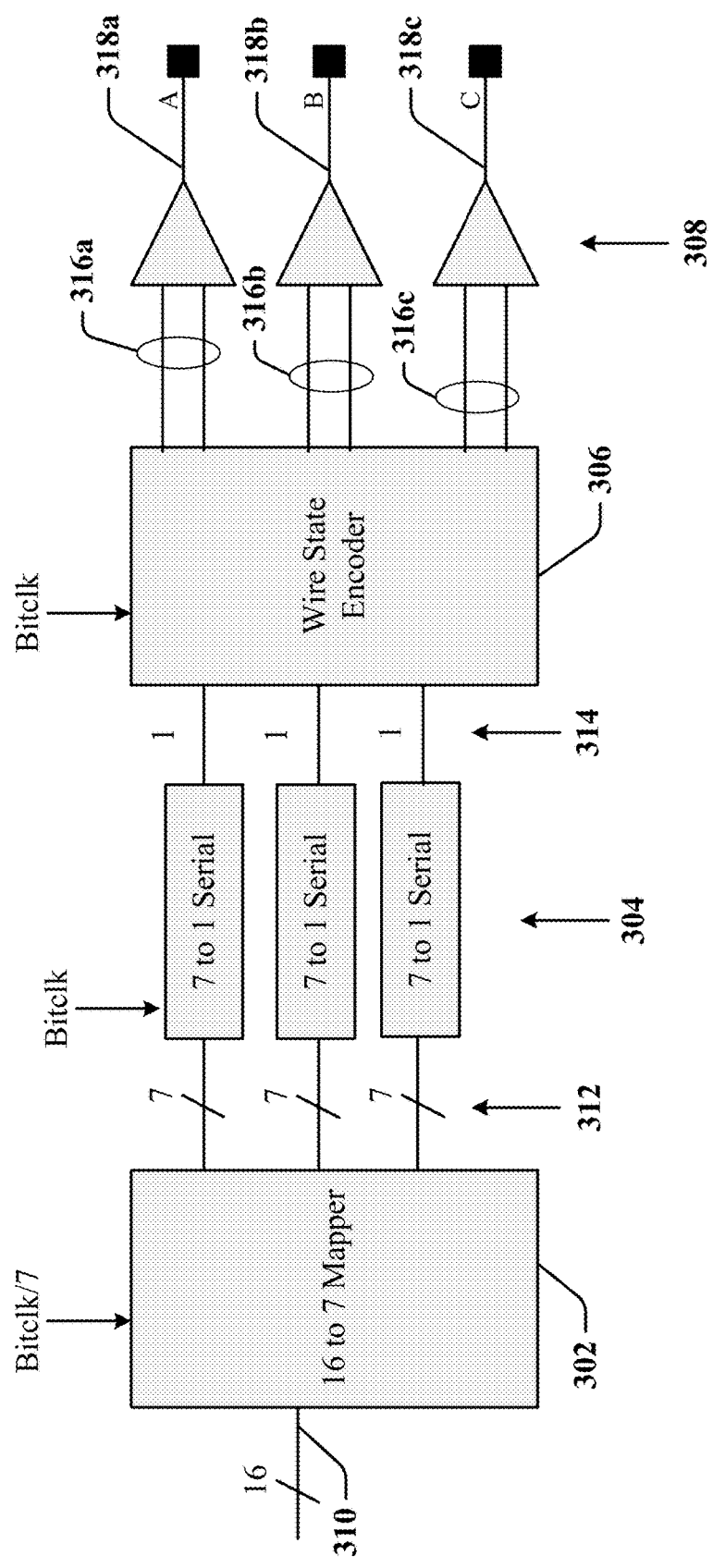
FIG. 3 illustrates a C-PHY 3-phase transmitter.

FIG. 3 is a diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include a positively driven state, a negatively driven state and an intermediate or undriven state. The positively driven state and the negatively driven state may be obtained by providing a voltage differential between two of the signal wires 318a, 318b and/or 318c, and/or by driving a current through two of the signal wires 318a, 318b and/or 318c connected in series such that the current flows in different directions in the two signal wires 318a, 318b and/or 318c. A third state may be provided as an undriven state realized by placing an output of a driver of a signal wire 318a, 318b or 318c in a high-impedance mode. Typically, there is no significant current flow through an undriven signal wire 318a, 318b or 318c. Alternatively, or additionally, the third state may be an intermediate state obtained on a signal wire 318a, 318b or 318c by passively or actively causing one signal wire 318a, 318b or 318c to attain a voltage level that lies substantially halfway between positive and negative voltage levels provided on driven signal wires 318a, 318b and/or 318c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 318a, 318b and 318c. The line drivers 308 may be implemented as unit-level current-mode or voltage-mode drivers. In some implementations, each line driver 308 may receive sets of signals 316a, 316b and 316c that determine the output state of corresponding signal wires 318a, 318b and 318c. In one example, each of the sets of signals 316a, 316b and 316c may include two or more signals, including a pull-up signal (PU signal) and a pull-down signal (PD signal) that, when high, activate pull-up and pull down circuits that drive the signal wires 318a, 318b and 318c toward a higher level or lower level voltage, respectively. In this example, when both the PU signal and the PD signal are low, the signal wires 318a, 318b and 318c may be terminated to a mid-level voltage.

For each transmitted symbol interval in an 3-wire, 3-phase polarity encoding scheme, at least one signal wire 318a, 318b or 318c is in the midlevel/undriven (0) voltage or current state, while the number of positively driven (+1 voltage or current state) signal wires 318a, 318b or 318c is equal to the number of negatively driven (−1 voltage or current state) signal wires 318a, 318b or 318c, such that the sum of current flowing to the receiver is always zero. For each symbol, the signaling state of at least one signal wire 318a, 318b or 318c is changed from the wire state transmitted in the preceding transmission interval.

In operation, a mapper 302 may receive and map 16-bit data 310 to 7 symbols 312. In the C-PHY example, each of the 7 symbols defines the states of the signal wires 318a, 318b and 318c for one symbol interval. The 7 symbols 312 may be serialized using parallel-to-serial converters 304 that provide a timed sequence of symbols 314 for each signal wire 318a, 318b and 318c. The sequence of symbols 314 is typically timed using a transmission clock. A 3-wire, 3-phase encoder 306 receives the sequence of 7 symbols 314 produced by the mapper one symbol at a time and computes the state of each signal wire 318a, 318b and 318c for each symbol interval. The 3-wire, 3-phase encoder 306 selects the states of the signal wires 318a, 318b and 318c based on the current input symbol 14 and the previous states of signal wires 318a, 318b and 318c.

The use of 3-wire, 3-phase encoding permits a number of bits to be encoded in a plurality of symbols where the bits per symbol is not an integer. In the example of a C-PHY communication link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
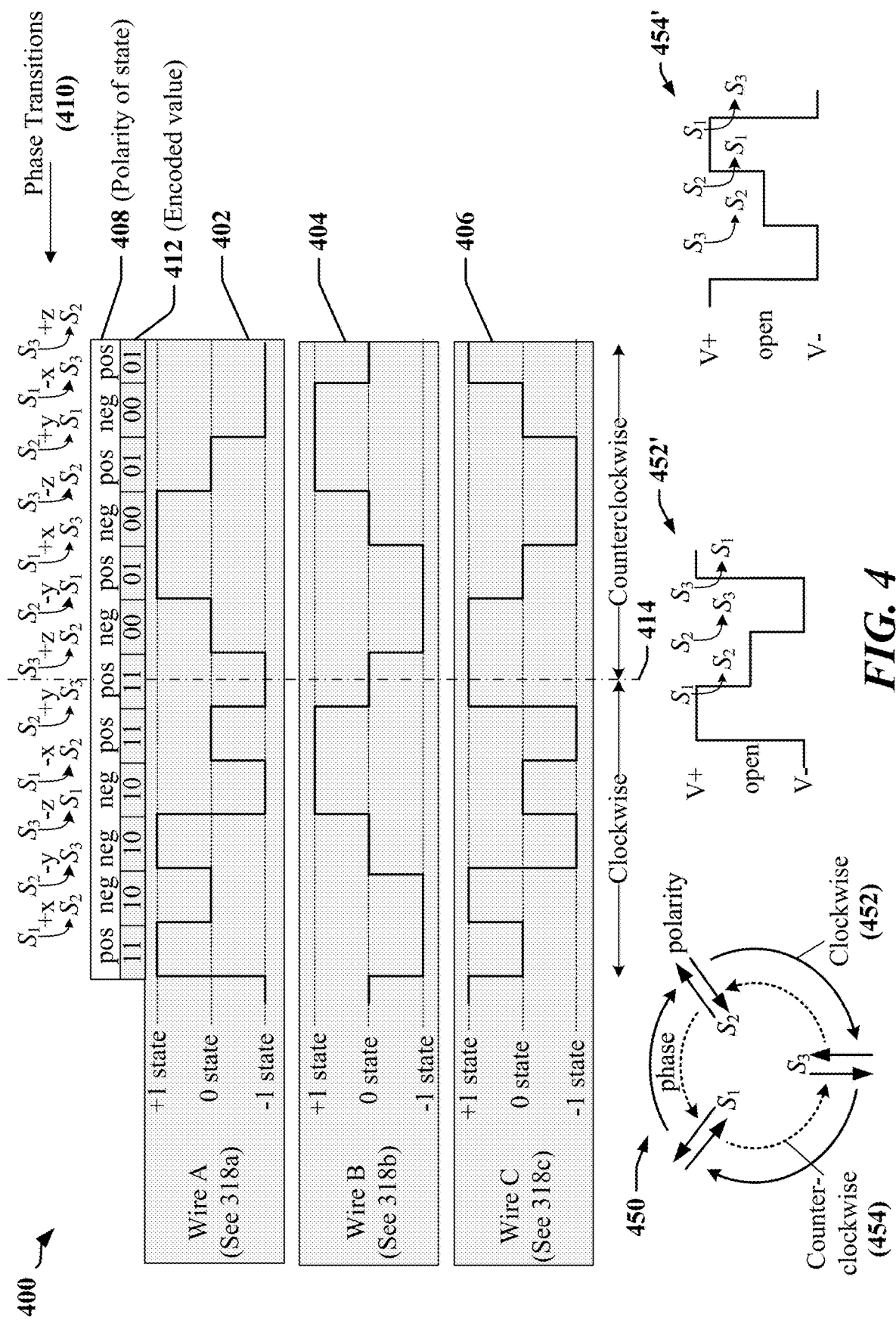
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$ from $S_3$ to $S_2$ and from $S_2$ to $S_1$. The three signal wires 318a, 318*b* and 318*c* carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 318*a*, 318*b* and 318*c* is in a different signaling states than the other wires. When more than 3 signal wires 318*a*, 318*b* and 318*c* are used in a 3-phase encoding system, two or more signal wires 318*a*, 318*b* and/or 318*c* can be in the same signaling state at each signaling interval, although each state is present on at least one signal wire 318*a*, 318*b* and/or 318*c* in every signaling interval.

Information may be encoded in the direction of rotation at each phase transition 410, and the 3-phase signal may change direction for each signaling state. Direction of rotation may be determined by considering which signal wires 318*a*, 318*b* and/or 318*c* are in the '0' state before and after a phase transition, because the undriven signal wire 318*a*, 318*b* and/or 318*c* changes at every signaling state in a rotating three-phase signal, regardless of the direction of rotation.

The encoding scheme may also encode information in the polarity 408 of the two signal wires 318*a*, 318*b* and/or 318*c* that are actively driven. At any time in a 3-wire implementation, exactly two of the signal wires 318*a*, 318*b*, 318*c* are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 318*a*, 318*b* and 318*c*, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

Figure 5:
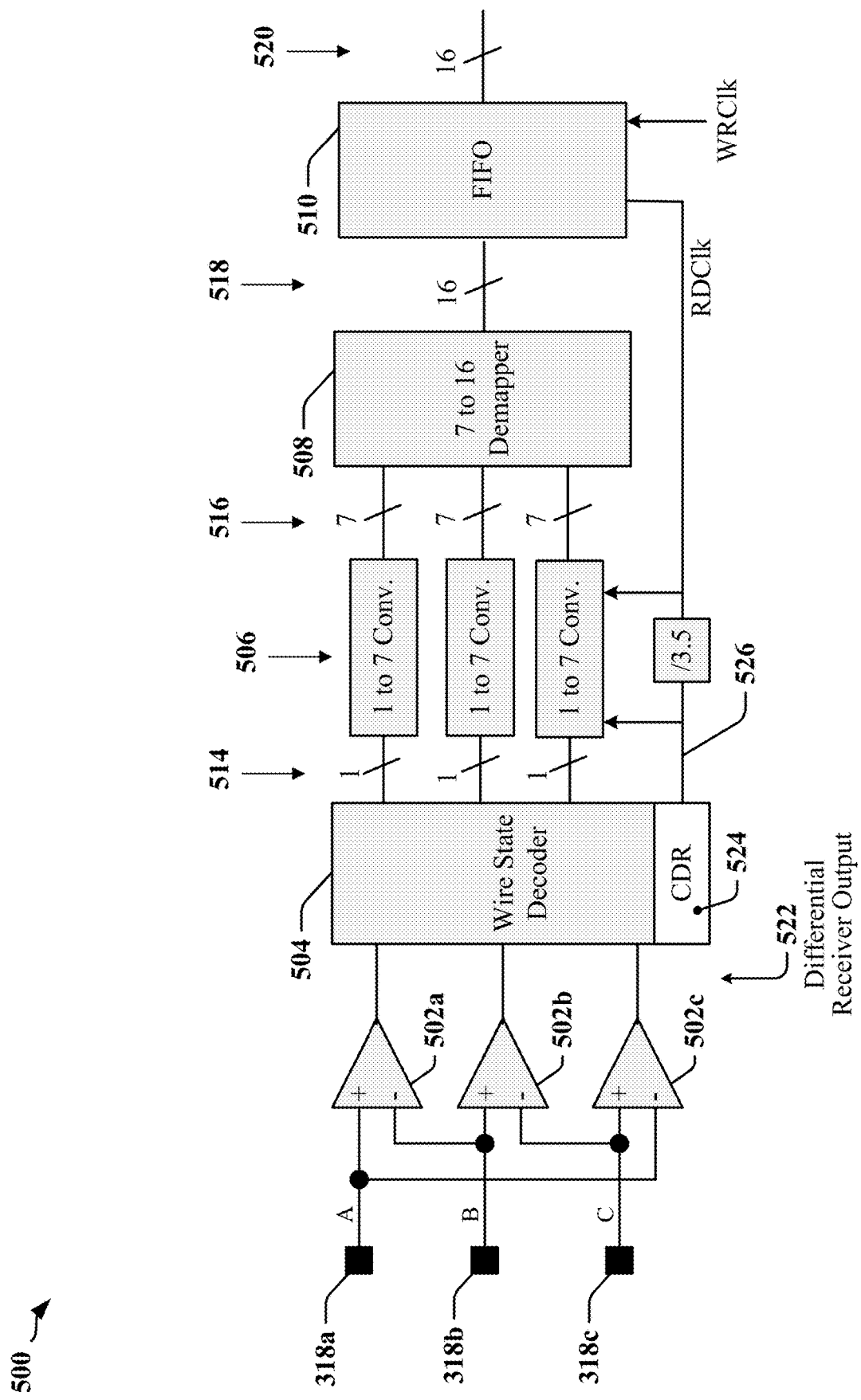
FIG. 5 illustrates a C-PHY 3-phase receiver.

FIG. 5 is a diagram illustrating certain aspects of a 3-wire, 3-phase decoder 500. Differential receivers 502*a*, 502*b*, 502*c* and a wire state decoder 504 are configured to provide a digital representation of the state of the three transmission lines (e.g., the signal wires 318*a*, 318*b* and 318*c* illustrated in FIG. 3), with respect to one another, and to detect changes in the state of the three transmission lines compared to the state transmitted in the previous symbol period. Seven consecutive states are assembled by the serial-to-parallel convertors 506 to obtain a set of 7 symbols 516 to be processed by the demapper 508. The demapper 508 produces 16 bits of data 518 that may be buffered in a first-in-first-out (FIFO) register 510 to provide output data 520.

The wire state decoder 504 may extract a sequence of symbols 514 from phase encoded signals received on the signal wires 318*a*, 318*b* and 318*c*. The symbols 514 are encoded as a combination of phase rotation and polarity as disclosed herein. The wire state decoder may include a CDR circuit 524 that extracts a clock 526 that can be used to reliably capture wire states from the signal wires 318*a*, 318*b* and 318*c*. A transition occurs on least one of the signal wires 318*a*, 318*b* and 318*c* at each symbol boundary and the CDR circuit 524 may be configured to generate the clock 526 based on the occurrence of a transition or multiple transitions. An edge of the clock may be delayed to allow time for all signal wires 318*a*, 318*b* and 318*c* to have stabilized and to thereby ensure that the current wire state is captured for decoding purposes.

Figure 6:
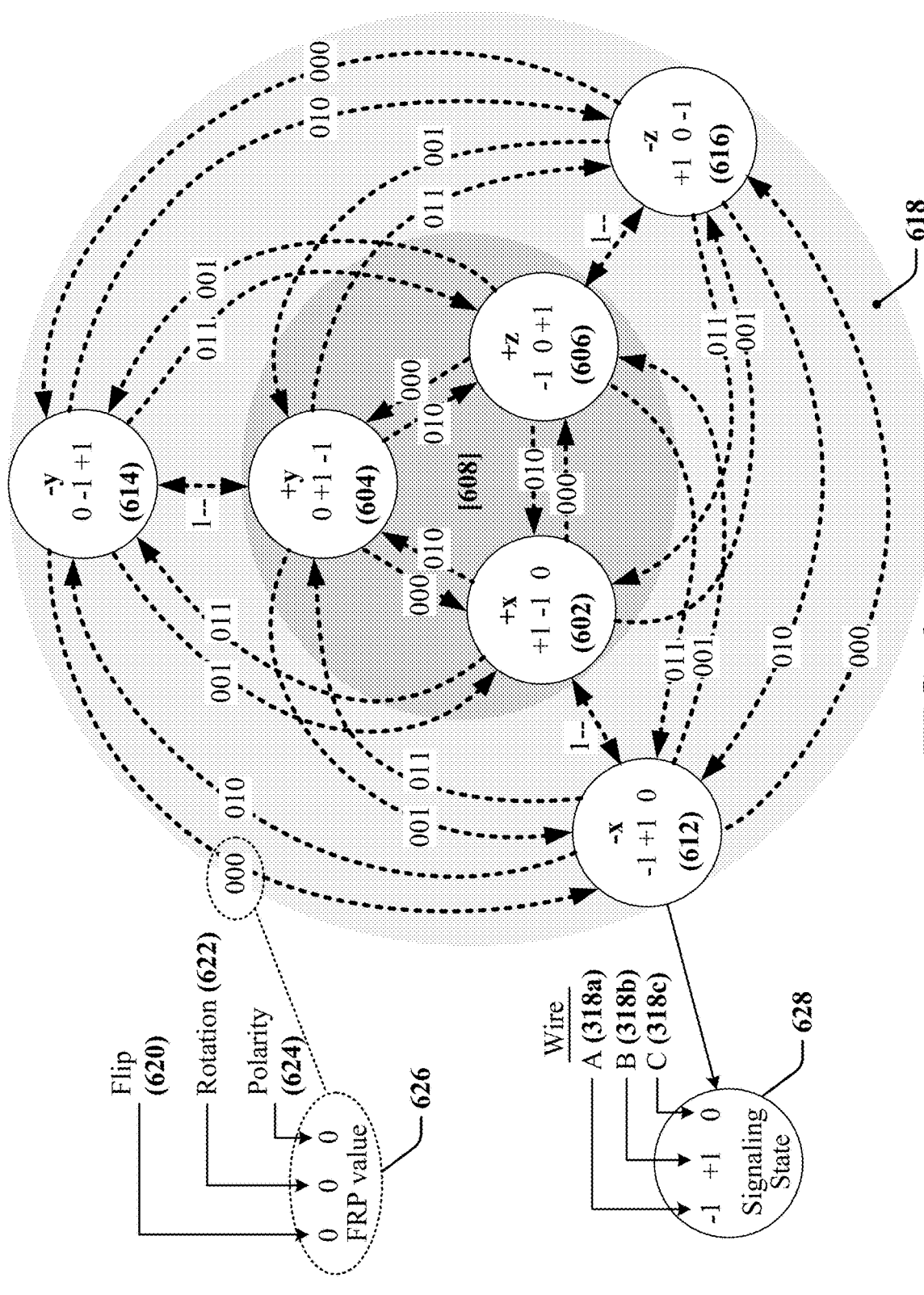
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible signaling states 602, 604, 606, 612, 614 and 616 in the state diagram 600 include and expand on the states shown in the circular state diagram 450 of FIG. 4. As shown in the exemplar of a state element 628, each signaling state 602, 604, 606, 612, 614 and 616 in the state diagram 600 defines voltage signaling state of the signal wires 318*a*, 318*b*, 318*c*, which are labeled A, B and C respectively. For example, in signaling state 602 (+x) wire A=+1, wire B=−1 and wire C=0, yielding output of differential receiver 502*a* (A−B)=+2, differential receiver 502*b* (B−C)=−1 and differential receiver 502*c* (C−A)=−1. Transition decisions taken by phase change detect circuits in a receiver are based on 5 possible levels produced by the differential receivers 502*a*, 502*b*, 502*c*, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs, and the polarity bit is redundant when a flip occurs. The FRP symbol 626 corresponds to wire state changes for each transition. The state diagram 600 may be separated into an inner circle 608 that includes the positive polarity signaling states 602, 604, 606 and an outer circle 618 that encompasses the negative polarity signaling states 612, 614, 616.

Figure 7:
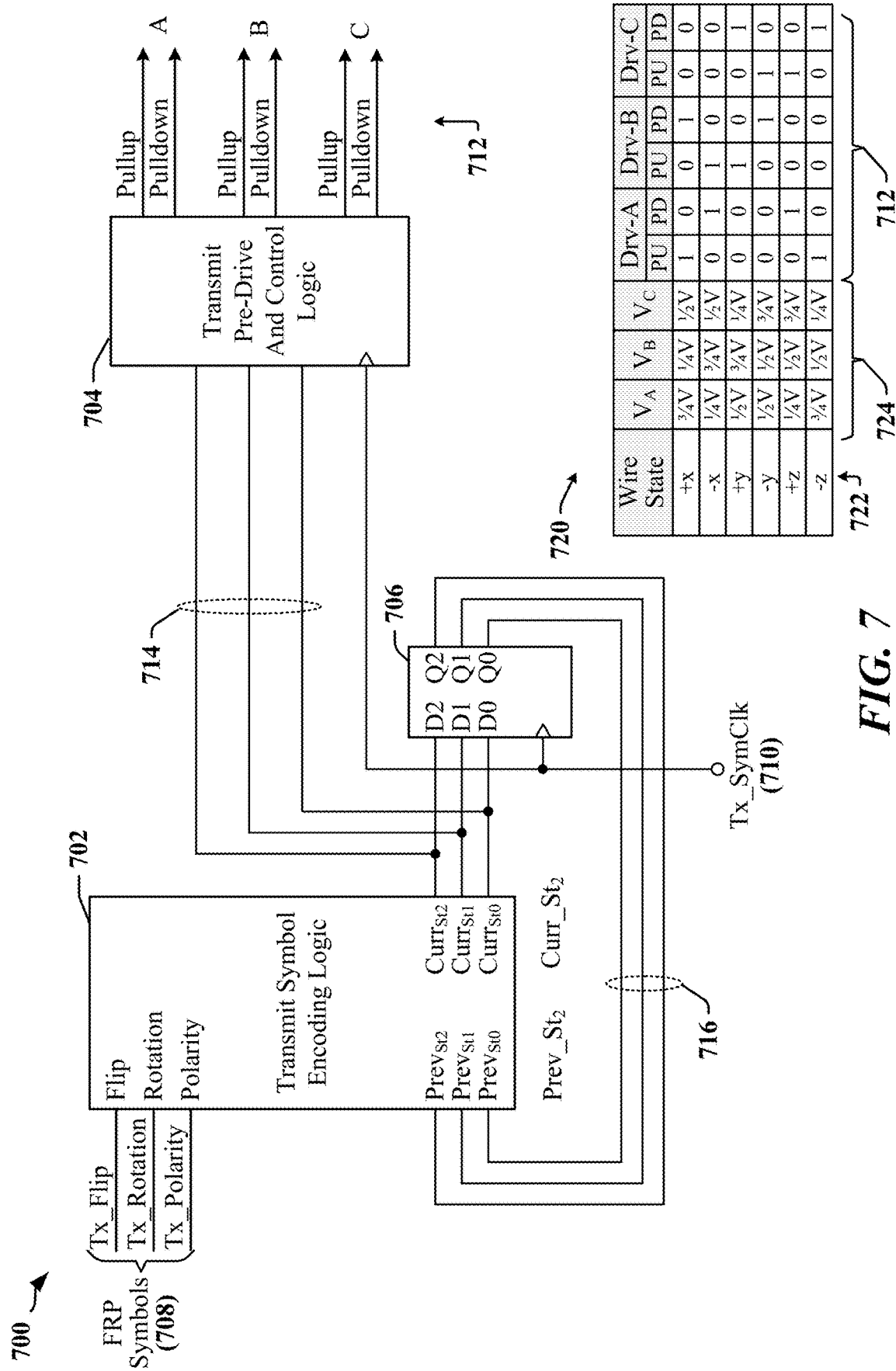
FIG. 7 illustrates one example of encoding in a C-PHY 3-phase transmitter.

FIG. 7 illustrates an example of wire state encoding 700 that may be used in certain C-PHY interfaces. A symbol encoder 702 receives a stream of FRP symbols 708 that may have the format of the FRP symbol 626 illustrated in FIG. 6. A mapper 302 (see FIG. 3) may generate the stream of FRP symbols 708 from data to be communicated over a C-PHY bus. The symbol encoder 702 provides a current transmit symbol 714 for each FRP symbol in the stream of FRP symbols 708 based on the immediately preceding transmit symbol 716. The immediately preceding transmit symbol 716 is maintained by flipflops or a register 706 configured to capture the current transmit symbol 714 based on timing provided by a symbol clock signal 710. The symbol clock signal 710 also provides timing for pre-drive and control circuit 704, which controls the operation of line drivers coupled to the C-PHY bus. In some instances, the pre-drive and control circuit 704 may capture and hold the current transmit symbol 714 for the duration of a cycle of the symbol clock signal 710. In some instances, the pre-drive and control circuit 704 may provide a set of signals 712 that control pull-up and pull-down sections of the line driver circuit. The table 720 illustrates the state of the set of signals 712 that produce the voltage levels 724 for each wire state 722 defined for the C-PHY bus.

Figure 8:
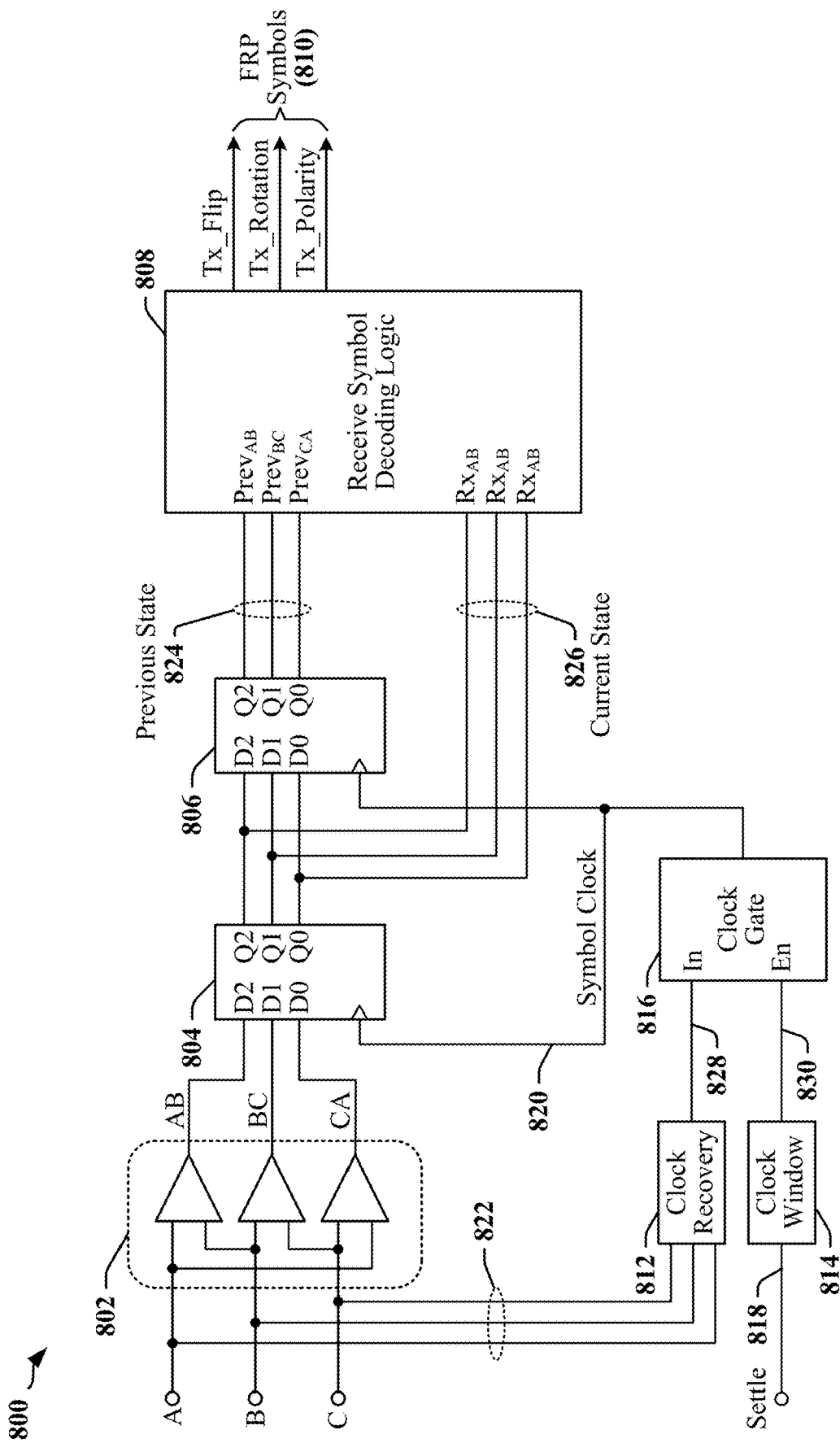
FIG. 8 illustrates one example of decoding in a C-PHY 3-phase receiver.

FIG. 8 illustrates an example of wire state decoding 800 that may be used in certain C-PHY interfaces. A set of comparators 802 monitors signaling state 822 of the C-PHY bus and produces difference signals that are captured as current wire state 826 by first flipflops or registers 804 based on timing provided by a symbol clock signal 820. A clock recovery circuit 812 monitors signaling state 822 of the C-PHY bus and produces a receive clock signal 828 that may be gated by gating logic 816 to produce the symbol clock signal 820. The gating logic 816 may receive an enable signal 830 from clock window logic 814 and the gating logic 816 provides the symbol clock signal 820 when a settle signal 818 indicates that the receive clock signal 828 is valid. Second flipflops or registers 806 provide the previous wire state 824 by capturing the current wire state 826 based on timing provided by the symbol clock signal 820.

A symbol decoder 808 produces a stream of FRP symbols 810 that may have the format of the FRP symbol 626 illustrated in FIG. 6. The stream of FRP symbols 810 may be provided to a demapper 508 (see FIG. 5) that decodes data from the stream of FRP symbols 810. The symbol decoder 808 produces each FRP symbol in the stream of FRP symbols 810 based on differences between previous wire state 824 and current wire state 826.

Increasing complexity and performance of application and sensors has produced corresponding increased demands for data rates and throughput. For example, increased resolution of imaging devices and imaging device can be expected to produce ever-increasing volumes of image data to be communicated over a C-PHY bus between application processors and other devices. Demand for higher frame rates and the provision of multiple imaging devices in an apparatus also multiply the volumes of image data to be transmitted and can reduce the time available to transmit the image data. Display systems are being concurrently provided with increased resolution and may be required to handle increased frame rates. The increased demand for throughput can be difficult to meet using a conventional C-PHY interface.

The C-PHY data path operates at full rate clock, whereby data is transmitted and sampled on a single type of edge of the transmitter's symbol clock signal or receiver's symbol clock signal respectively. The type of edge used for timing in a symbol clock signal may be the rising edge or the falling edge, based on the circuit design employed in an implementation. Data throughput is determined by the symbol rate of the C-PHY interface, where symbol rate may be expressed as the number of symbols transmitted per second over the C-PHY bus. According to conventional C-PHY specifications:

$$\text{Symbol rate} = \text{Symbol clock frequency}.$$

Data throughput may be measured as the number of bits per second transmitted over the C-PHY bus. In one example, approximately 2.32 bits can be encoded in the transitions between consecutively-transmitted symbols, such that $$\text{Data throughput} = 2.32 * (\text{Symbol clock frequency}).$$

Increased data throughput can be obtained by increasing the symbol clock frequency. The ability to increase symbol clock frequency is limited by the performance of circuits in C-PHY transmitters and receivers. In many implementations, switching time defined for logic gates may limit the maximum symbol clock frequency, and/or may limit the number of levels of gates in circuits that operate at symbol clock frequency. In one example, differences in propagation time through logic circuits of a receiver can limit the time interval in which a symbol can be reliably sampled. In another example, generation and distribution of a high-speed full-rate symbol clock signal may be difficult to accomplish and may complicate integrated circuit design.

A C-PHY interface implemented in accordance with certain aspects of this disclosure can increase data throughput for a C-PHY interface without increasing the symbol clock rate. In one aspect, timing in a C-PHY data path may controlled by a half-rate symbol clock signal. Symbols can be transmitted on both rising and falling edges of the symbol clock signal when a half-rate symbol clock signal is used, relaxing the frequency requirement for the symbol clock signal at higher symbol rates. The use of a half-rate symbol clock signal in accordance with certain aspects of this disclosure provides that:

$$\text{Symbol rate} = 2 * (\text{Symbol clock frequency}).$$

Data throughput is measured as the number of bits per second transmitted over the C-PHY bus. When 2.32 bits are encoded in the transitions between consecutively-transmitted symbols:

$$\text{Data throughput} = 4.64 * (\text{Symbol clock frequency}).$$

In one example, the data throughput obtained using a 10 GHz symbol clock signal in a conventional C-PHY interface can be obtained using a 5 GHz symbol clock signal in a C-PHY interface implemented in accordance with certain aspects of this disclosure.

Certain aspects of this disclosure relate to the structure and configuration of C-PHY transmitters and receivers that can operate using half-rate symbol clock signals. In various examples, the C-PHY transmitters and receivers are configured for a dual path architecture, each path encoding or decoding alternate symbols in a sequence of symbols. For the purposes of this description, the paths in a transmitter or receiver configured for use with a half-rate symbol clock are designated as odd and even paths. In one example, the odd path in a transmitter or receiver handles the symbols in a sequence that are transmitted first, third, fifth symbols and so on, and the even path in a transmitter or receiver handles the symbols in a sequence that are transmitted second, fourth, sixth symbols and so on. In operation, the paths are symmetric in structure, and symbols or paths may be arbitrarily designated as odd and even. According to one aspect, a C-PHY transmitter that is implemented with a dual path architecture includes a mapper that provides odd and even symbols to corresponding odd and even paths. According to one aspect, a C-PHY receiver that is implemented with a dual path architecture includes a demapper that receives odd and even symbols from corresponding odd and even paths and interleaves the odd and even symbols to provide a sequence of symbols for decoding.

Figure 9:
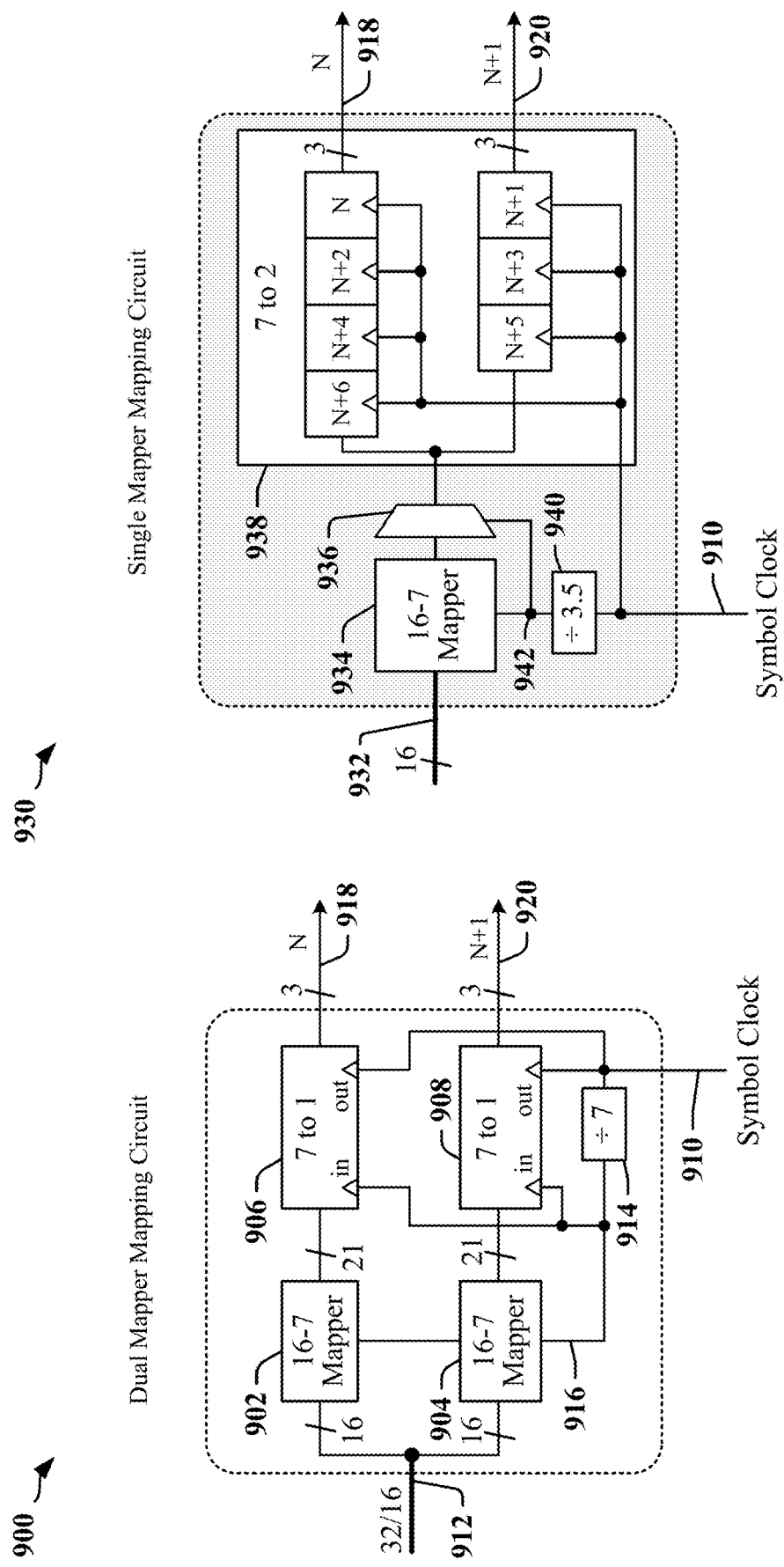
FIG. 9 illustrates examples of mapping circuits implemented with a dual path architecture in accordance aspects of the disclosure.

FIG. 9 illustrates examples of mapping circuits 900, 930 that may be implemented in C-PHY transmitters configured with a dual path architecture in accordance aspects of the disclosure. The first mapping circuit 900 includes two mappers 902, 904, each mapper 902, 904 feeding one of the paths in a transmitter, where the transmitter is implemented with an even symbol path and an odd symbol path. Each even symbol defines a signaling state that is immediately followed by a signaling state defined by an odd symbol and each odd symbol defines a signaling state that is immediately followed by a signaling state defined by an even symbol.

The first mapping circuit 900 may receive input data 912 as two 16-bit words or as a single 32-bit word. The first mapping circuit 900 splits 32-bit words into two 16-bit words. Each 16-bit word can be mapped into a sequence of 7 FRP symbols by respective mappers 902, 904. Each 21-bit representation of the sequence of 7 FRP symbols may be serialized to obtain a timed sequence of FRP symbols using respective serializers 906, 908. The serializers 906, 908 provide one symbol per clock cycle of a half-rate symbol clock signal 910, which has a frequency equal to half the desired symbol transmission rate. In the illustrated example, two mappers 902, 904 provide a sequence of seven 3-bit FRP symbols to corresponding serializers 906, 908.

Timing of the mappers 902, 904 is controlled by a word clock signal 916 provided by a circuit 914 that divides the half-rate symbol clock signal 910 by seven. Input timing of the serializers 906, 908 is controlled by the word clock signal 916 and output timing of the serializers 906, 908 is controlled by the half-rate symbol clock signal 910.

In one example, the first mapping circuit 900 provides FRP symbols to the even symbol path 918 that encode a 16-bit word that is different from the 16-bit word encoded in FRP symbols provided to the odd symbol path 920. For example, FRP symbol N is provided to the even symbol path 918 and symbol N+1 is provided to the odd symbol path 920, where symbol N+1 follows symbol N in transmission. The sequences obtained from the two mappers 902, 904 may be provided in turn to the even and odd symbol paths 918, 920, effectively combining the two sequences of 7 FRP symbols into a 14-symbol sequence.

In another example, each of the two mappers 902, 904 may be configured as an even mapper 902 and an odd mapper 904, both mappers 902, 904 being configured to receive the same 32-bit word. In this example, the even mapper 902 provides the even symbols in the 14-symbol sequence that represents the 32-bit word, while the odd mapper 904 provides the odd symbols in the 14-symbol sequence that represents the 32-bit word. Symbols produced by the mappers 902, 904 can be serialized and provided to the corresponding symbol path. 918, 920. In this example, signaling on the serial bus is consistent with conventional C-PHY transmitters.

The second mapping circuit 930 uses a single mapper 934 and is configured to receive data in 16-bit words. The single mapper 934 is configured to encode each 16-bit word in a sequence of 7 FRP symbols. The sequence of 7 FRP symbols may be loaded into a 7-to-2 shift register 938 using a demultiplexer 936 that provides the even and odd symbols to shift registers coupled to the corresponding even and odd symbol paths 918, 920. The demultiplexer 936 is clocked at half the input data clock rate, using a clock signal 942 derived from the symbol clock signal 910 through the operation of a divider 940.

Figure 10:
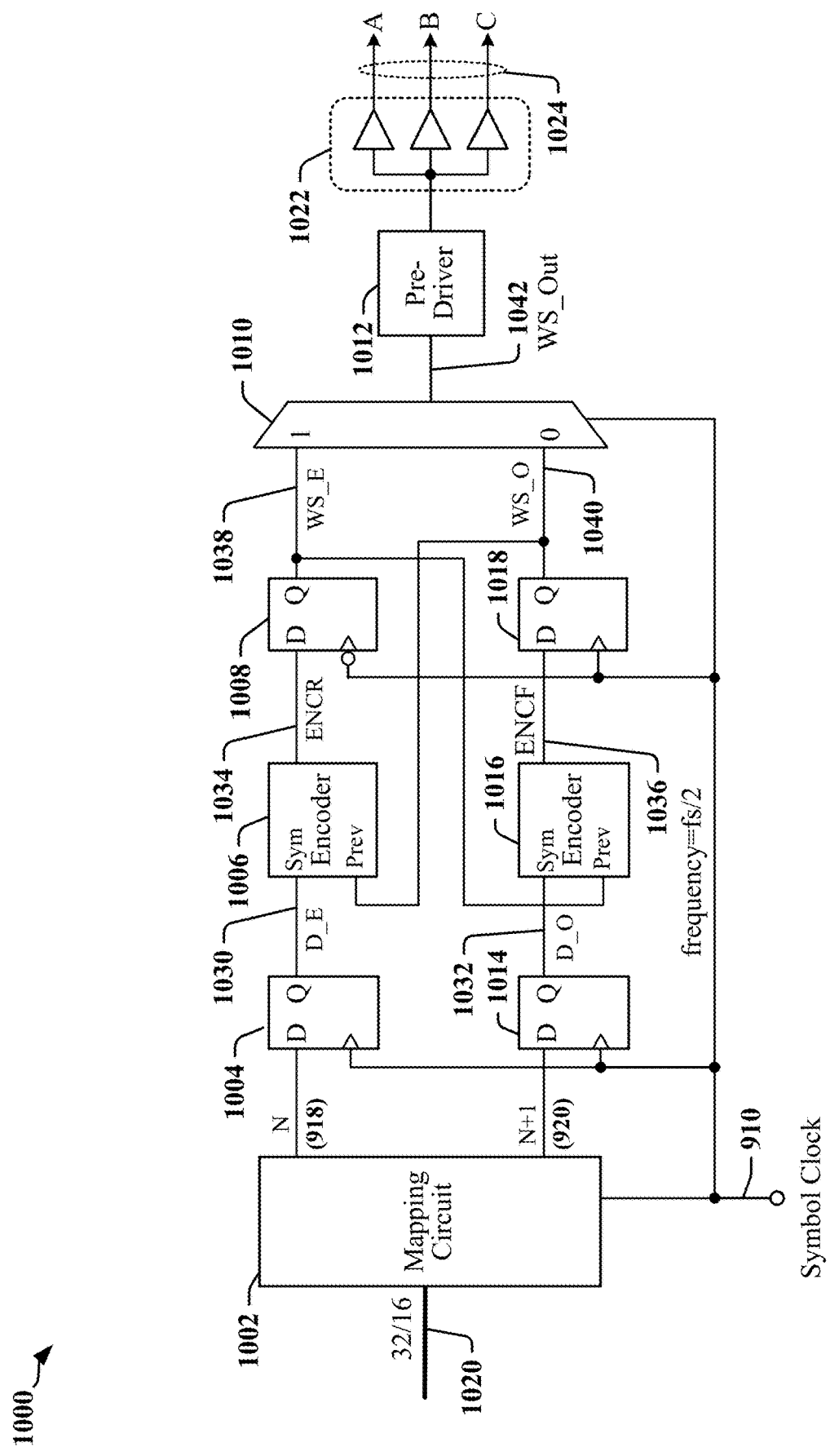
FIG. 10 illustrates a first example of a transmitter configured to use a half-rate symbol clock signal to encode input data for a C-PHY interface in accordance with certain aspects disclosed herein.
Figure 11:
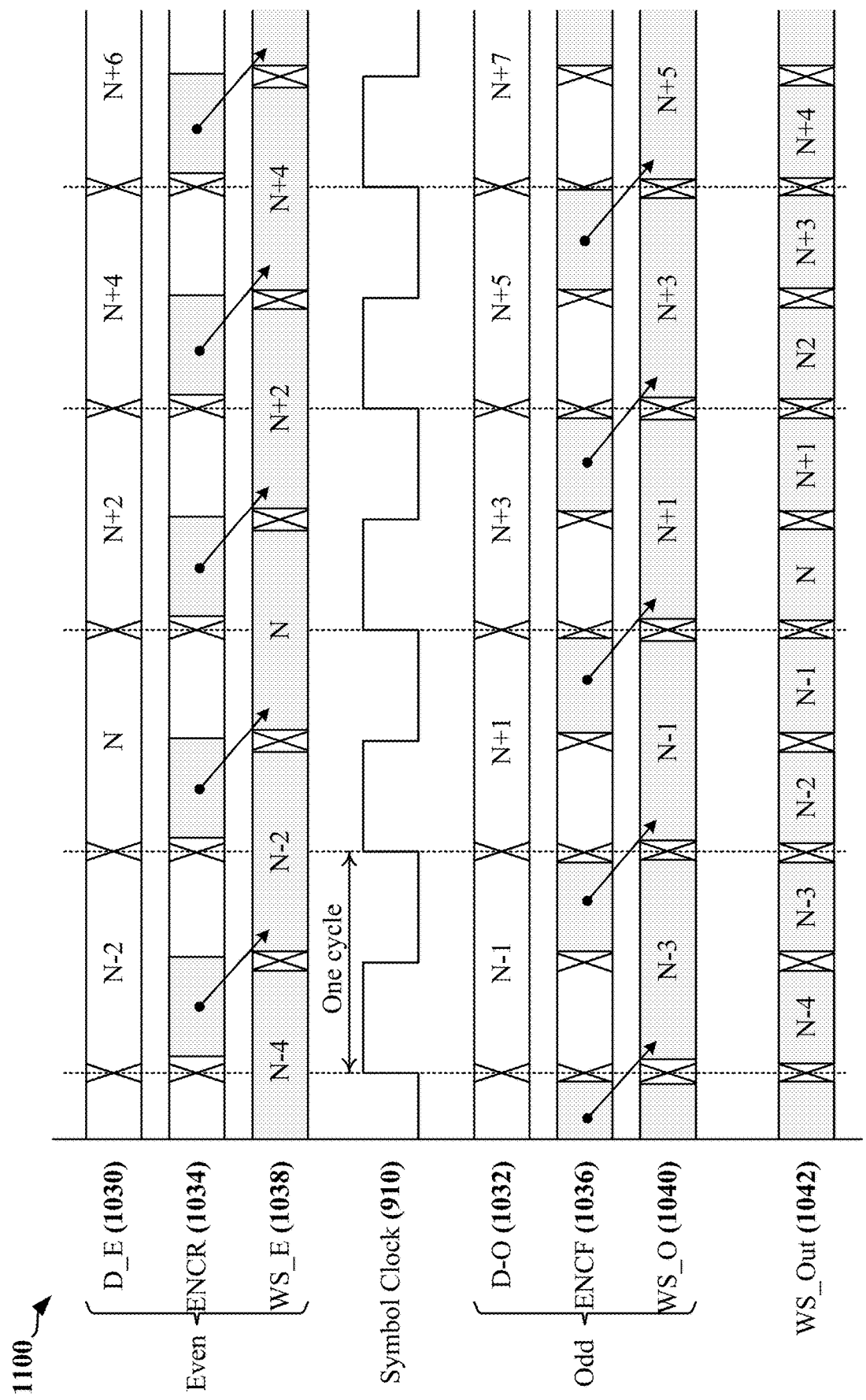
FIG. 11 illustrates an example of timing for the transmitter illustrated in FIG. 10.

FIG. 10 illustrates a first example of a transmitter 1000 configured to use a half-rate symbol clock signal 910 to encode input data 1020 in symbols that control signaling state of a C-PHY trio 1024. The transmitter 1000 is implemented with an even symbol path and an odd symbol path, where each even symbol defines a signaling state that is immediately followed by a signaling state defined by an odd symbol and each odd symbol defines a signaling state that is immediately followed by a signaling state defined by an even symbol. In some implementations, the resultant sequence of symbols complies with C-PHY protocols. FIG. 11 illustrates timing 1100 for the transmitter 1000.

The input data 1020 may be received by a mapping circuit 1002 as two 16-bit words or as a single 32-bit word. The mapping circuit 1002 may correspond to one of the mapping circuits 900, 930 illustrated in FIG. 9, for example. Each symbol in the sequence of FRP symbols provided by the mapping circuit 1002 is captured by one of the flipflops 1004 and 1014 that maintain the next FRP symbols 1030, 1032 to be encoded for transmission. For each cycle of the half-rate symbol clock signal 910, the flipflop 1004 in the even symbol path provides the input to a first wire state encoder 1006, and the flipflop 1014 in the odd symbol path provides the input to a second wire state encoder 1016.

The first wire state encoder 1006 provides, as its output, a next even 3-bit wire state symbol 1034 to define signaling state of each wire of the C-PHY trio 1024. The next even 3-bit wire state symbol 1034 is generated based on differences between the even 3-bit symbol 1030 and the current odd 3-bit wire state symbol 1040 generated on the odd symbol path. A flipflop 1008 clocked by an inverse of the half-rate symbol clock signal 910 provides the current even 3-bit wire state symbol 1038 by capturing the next even 3-bit wire state symbol 1034 when it is clocked through flipflop 1008 in order to be transmitted.

The second wire state encoder 1016 provides, as its output, a next odd 3-bit wire state symbol 1036 to define signaling state of each wire of the C-PHY trio 1024. The next odd 3-bit wire state symbol 1036 is generated based on differences between the odd 3-bit symbol 1032 and the current even 3-bit wire state symbol 1038 generated on the even symbol path. A flipflop 1018 clocked by the half-rate symbol clock signal 910 provides the current odd 3-bit wire state symbol 1040 by capturing the next odd 3-bit wire state symbol 1036 when it is clocked through flipflop 1018 in order to be transmitted.

A multiplexer 1010 selects its output 1042 from the current even 3-bit wire state symbol 1038 and the current odd 3-bit wire state symbol 1040. The output 1042 of the multiplexer 1010 is provided to a pre-drive and control circuit 1012 that controls a set of line drivers 1022 coupled to the C-PHY trio 1024. The multiplexer 1010 is controlled by the half-rate symbol clock signal 910, such that even and odd symbols control the state of the 1002 in different phases (half-cycles) of the half-rate symbol clock signal 910.

Figure 12:
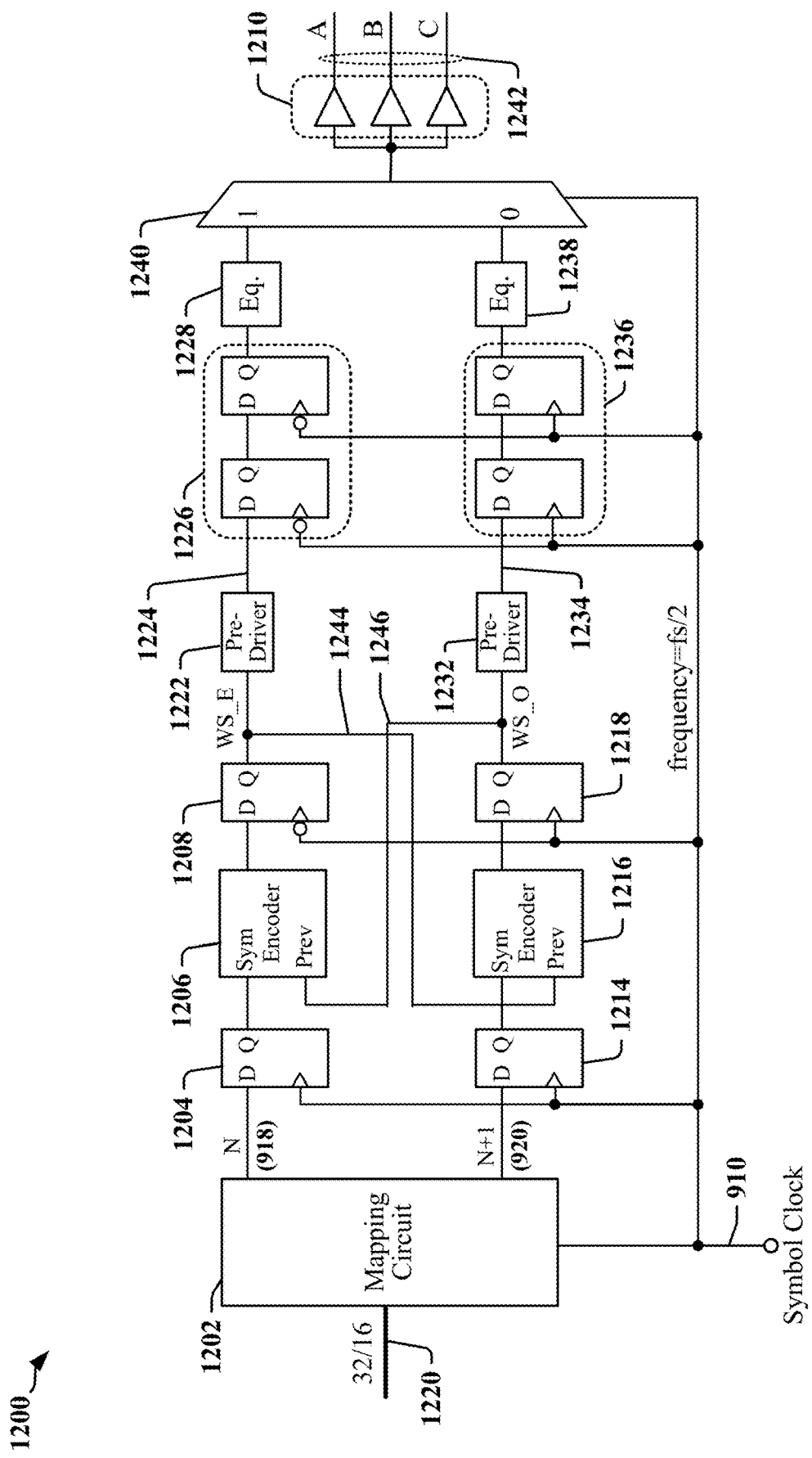
FIG. 12 illustrates a second example of a transmitter configured to use a half-rate symbol clock signal to encode input data for a C-PHY interface in accordance with certain aspects disclosed herein.

FIG. 12 illustrates a second example of a transmitter 1200 configured to use a half-rate symbol clock signal 910 to encode input data 1220 in symbols that control signaling state of a C-PHY trio 1242. The transmitter 1200 operates in a similar fashion to the transmitter 1000 of FIG. 10 with added pipeline circuits 1226, 1236 that support equalization.

The transmitter 1200 is implemented with an even symbol path and an odd symbol path, where each even symbol defines a signaling state that is immediately followed by a signaling state defined by an odd symbol and each odd symbol defines a signaling state that is immediately followed by a signaling state defined by an even symbol. The resultant sequence of symbols complies with C-PHY protocols.

The input data 1220 may be received by a mapping circuit 1202 as two 16-bit words or as a single 32-bit word. The mapping circuit 1202 may correspond to one of the mapping circuits 900, 930 illustrated in FIG. 9, for example. Each symbol in the sequence of FRP symbols provided by the mapping circuit 1202 is captured by one of the flipflops 1204 and 1214 that maintain the next FRP symbols for processing. For each cycle of the half-rate symbol clock signal 910, the flipflop 1204 in the even symbol path provides the input to a first wire state encoder 1206, and the flipflop 1214 in the odd symbol path provides the input to a second wire state encoder 1216.

The first wire state encoder 1206 provides, as its output, a next even 3-bit wire state symbol to define signaling state of each wire of the C-PHY trio 1242. The next even 3-bit wire state symbol is generated based on differences between the next even FRP symbol and the current odd 3-bit wire state symbol 1246 generated on the odd symbol path. A flipflop 1208 clocked by an inverse of the half-rate symbol clock signal 910 provides the current even 3-bit wire state symbol 1244 by capturing the next even 3-bit wire state symbol provided by the first wire state encoder 1206 when it is clocked through flipflop 1208 in order to be transmitted.

The second wire state encoder 1216 provides, as its output, a next odd 3-bit wire state symbol to define signaling state of each wire of the C-PHY trio 1242. The next odd 3-bit wire state symbol is generated based on differences between the next odd FRP symbol and the current even 3-bit wire state symbol 1244 generated on the even symbol path. A flipflop 1218 clocked by the half-rate symbol clock signal 910 provides the current odd 3-bit wire state symbol 1246 by capturing the next odd 3-bit wire state symbol provided by the second wire state encoder 1216 when it is clocked through flipflop 1218 in order to be transmitted.

In the illustrated example, the current even 3-bit wire state symbol 1244 and the current odd 3-bit wire state symbol 1246 are provided to respective even and odd pre-drive and control circuits 1222, 1232 that produce one or more driver control signals 1224, 1234 configured to control a set of line drivers 1210 coupled to the C-PHY trio 1242. The driver control signals 1224, 1234 are provided to respective pipeline circuits 1226, 1236 that provide a delay sufficient to enable equalization circuits 1228, 1238 to determine an equalization configuration for the driver control signals 1224, 1234. In the illustrated example, the pipeline circuits 1226, 1236 include two or more flipflops that delay the driver control signals 1224, 1234 by a corresponding two or more clock cycles. The flipflops in the pipeline circuit 1226 for the even symbol path are clocked by the inverse of the half-rate symbol clock signal 910 and the flipflops in the pipeline circuit 1236 for the odd symbol path are clocked by the half-rate symbol clock signal 910 to maintain the timing relationship established between the even and odd symbol paths. The delayed driver control signals are provided by respective pipeline circuits 1226, 1236 to equalizer circuits 1228, 1238 that may apply a timing adjustment to certain of the delayed driver control signals, generate driver amplitude control signals for certain of the delayed driver control signals, or provide some combination of timing and amplitude adjustments. The equalizer circuits 1228, 1238 provide the delayed driver control signals and/or timing and amplitude adjustment control signals to the multiplexer 1240.

The multiplexer 1240 selects between the outputs of the equalizer circuits 1228, 1238 to provide its output. The output of the multiplexer 1240 is provided to the set of line drivers 1210 coupled to the C-PHY trio 1242. The multiplexer 1240 is controlled by the half-rate symbol clock signal 910, such that even and odd symbols control the state of the C-PHY trio 1242 in different phases (half-cycles) of the half-rate symbol clock signal 910.

A receiver configured to decode sequences of symbols transmitted in accordance with timing provided by a half-rate symbol clock signal may be configured with separate even and odd symbol paths. Difference signal processors may be employed to demultiplex the difference signals to obtain current and previous wire states.

Figure 13:
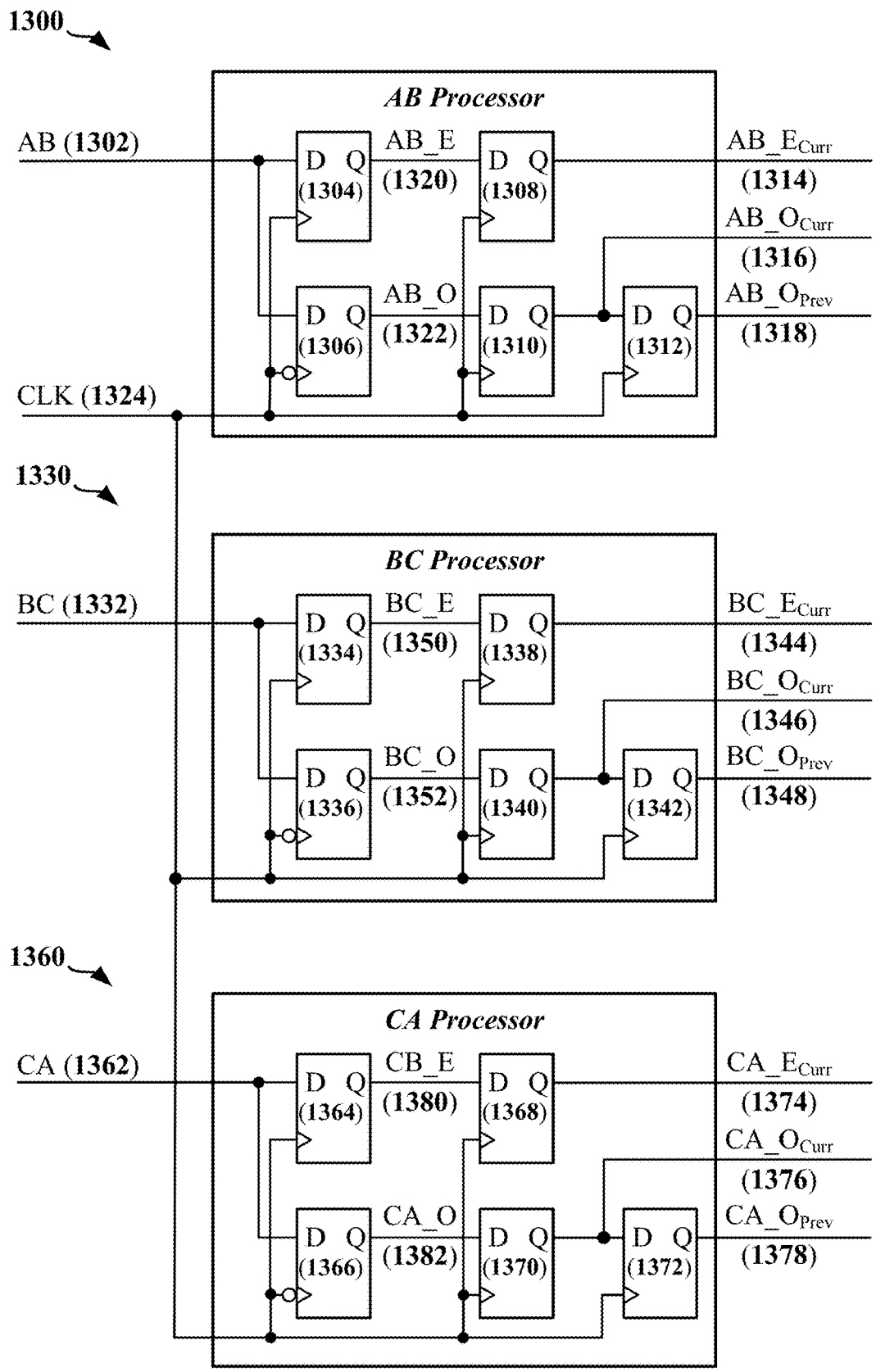
FIG. 13 illustrates difference signal processors that may be used in a receiver configured for half-rate symbol clock operation in accordance with certain aspects of this disclosure.

FIG. 13 illustrates one example of difference signal processors 1300, 1330 and 1360 that may be used in a receiver configured for half-rate symbol clock operation in accordance with certain aspects of this disclosure.

Figure 15:
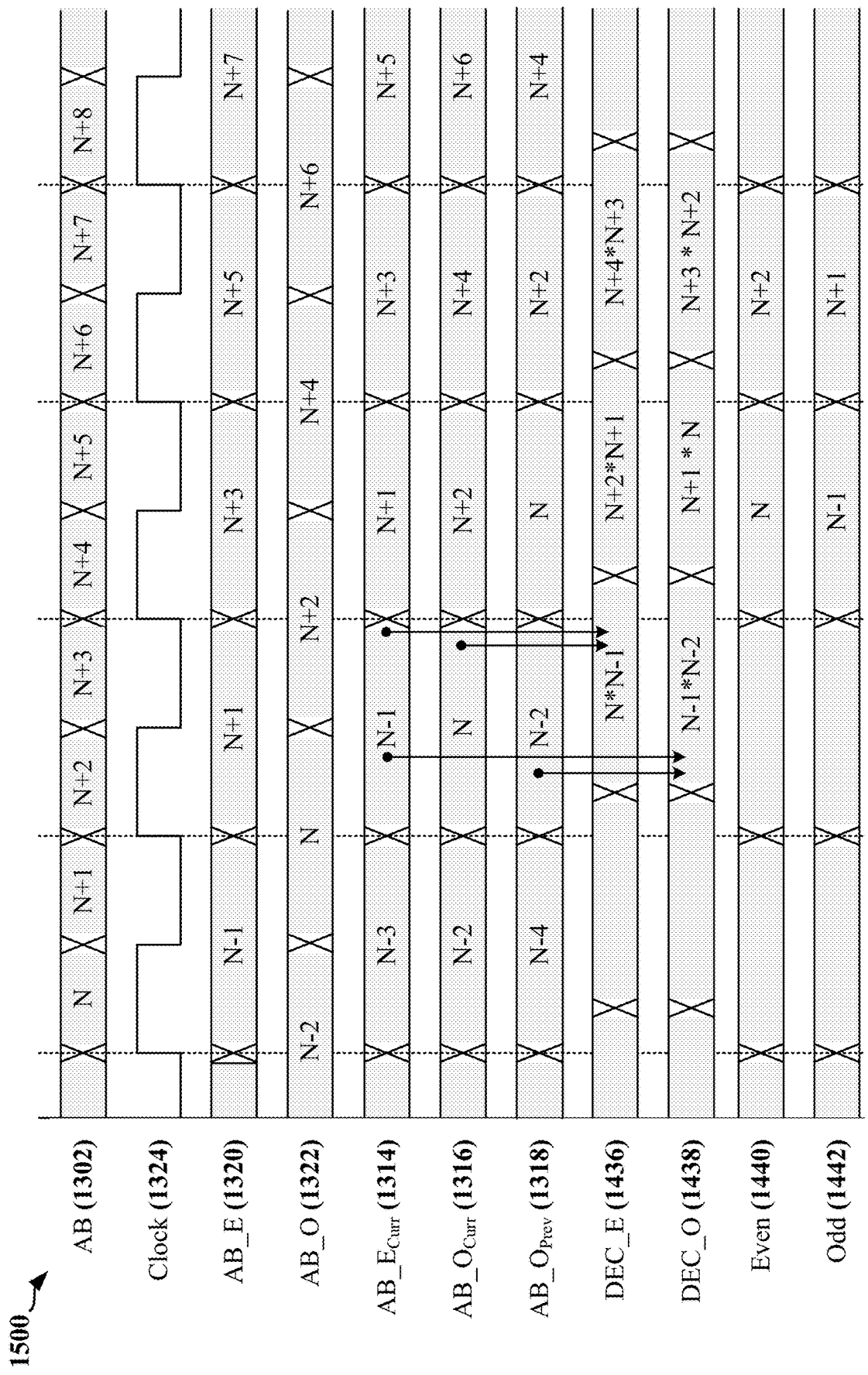
FIG. 15 illustrates timing associated with the receiver illustrated in FIG. 14.

An AB difference signal processor 1300 receives the AB difference signal 1302 from a comparator or line receiver circuit. The AB difference signal 1302 may be received from one of a set of comparators such as the set of comparators 802 illustrated in FIG. 8. The comparators provide a set of difference signals {AB, BC, CA} representing the difference in signaling state of the trio of wires (referenced as wires A, B and C) in a C-PHY bus. In some implementations, the AB difference signal 1302 is a multi-bit signal and/or may be transmitted over two or more connectors or wires. FIG. 15 is a timing diagram 1500 that includes a snapshot of the AB difference signal 1302, covering the signaling state for received symbol intervals {N, N+1, . . . N+8}. The AB difference signal processor 1300 includes a first flipflop 1304 that is clocked by the half-rate symbol clock signal 1324 and configured to capture even AB state 1320, including AB state for each of the set of symbols {N−1, N+1, N+3, N+5 and N+7}.

The AB difference signal processor 1300 includes a second flipflop 1306 that is clocked by an inverse of the half-rate symbol clock signal 1324 and configured to capture odd AB states 1322, including state for each of the set of symbols {N, N+2, N+4 and N+6}. The AB difference signal processor 1300 also includes third and fourth flipflops 1308, 1310 that are clocked by the half-rate symbol clock signal 1324 and that provide aligned current even AB states 1314 and current odd AB states 1316. The AB difference signal processor 1300 also includes a fifth flipflop 1312 that is clocked by the half-rate symbol clock signal 1324 and that captures current odd AB states 1316 to provide previous odd AB states 1318 aligned in time with corresponding current even AB states 1314 and current odd AB states 1316.

A BC difference signal processor 1330 receives the BC difference signal 1332 from a comparator or line receiver circuit. The BC difference signal 1332 may be received from one of a set of comparators such as the set of comparators 802 illustrated in FIG. 8. In some implementations, the BC difference signal 1332 is a multi-bit signal and/or may be transmitted over two or more connectors or wires. The BC difference signal processor 1330 includes a first flipflop 1334 that is clocked by the half-rate symbol clock signal 1324 and configured to capture even BC state 1350, including BC state for each of the set of symbols {N−1, N+1, N+3, N+5 and N+7}.

The BC difference signal processor 1330 includes a second flipflop 1336 that is clocked by an inverse of the half-rate symbol clock signal 1324 and configured to capture odd BC states 1352, including state for each of the set of symbols {N, N+2, N+4 and N+6}. The BC difference signal processor 1330 also includes third and fourth flipflops 1338, 1340 that are clocked by the half-rate symbol clock signal 1324 and that provide aligned current even BC states 1344 and current odd BC states 1346. The BC difference signal processor 1330 also includes a fifth flipflop 1342 that is clocked by the half-rate symbol clock signal 1324 and that captures current odd BC states 1346 to provide previous odd BC states 1348 aligned in time with corresponding current even BC states 1344 and current odd BC states 1346.

A CA difference signal processor 1360 receives the CA difference signal 1362 from a comparator or line receiver circuit. The CA difference signal 1362 may be received from one of a set of comparators such as the set of comparators 802 illustrated in FIG. 8. In some implementations, the CA difference signal 1362 is a multi-bit signal and/or may be transmitted over two or more connectors or wires. The CA difference signal processor 1360 includes a first flipflop 1364 that is clocked by the half-rate symbol clock signal 1324 and configured to capture even CA state 1380, including CA state for each of the set of symbols {N−1, N+1, N+3, N+5 and N+7}.

The CA difference signal processor 1360 includes a second flipflop 1366 that is clocked by an inverse of the half-rate symbol clock signal 1324 and configured to capture odd CA states 1382, including state for each of the set of symbols {N, N+2, N+4 and N+6}. The CA difference signal processor 1360 also includes third and fourth flipflops 1368, 1370 that are clocked by the half-rate symbol clock signal 1324 and that provide aligned current even CA states 1374 and current odd CA states 1376. The CA difference signal processor 1360 also includes a fifth flipflop 1372 that is clocked by the half-rate symbol clock signal 1324 and that captures current odd CA states 1376 to provide previous odd CA states 1378 aligned in time with corresponding current even CA states 1374 and current odd CA states 1376.

Figure 14:
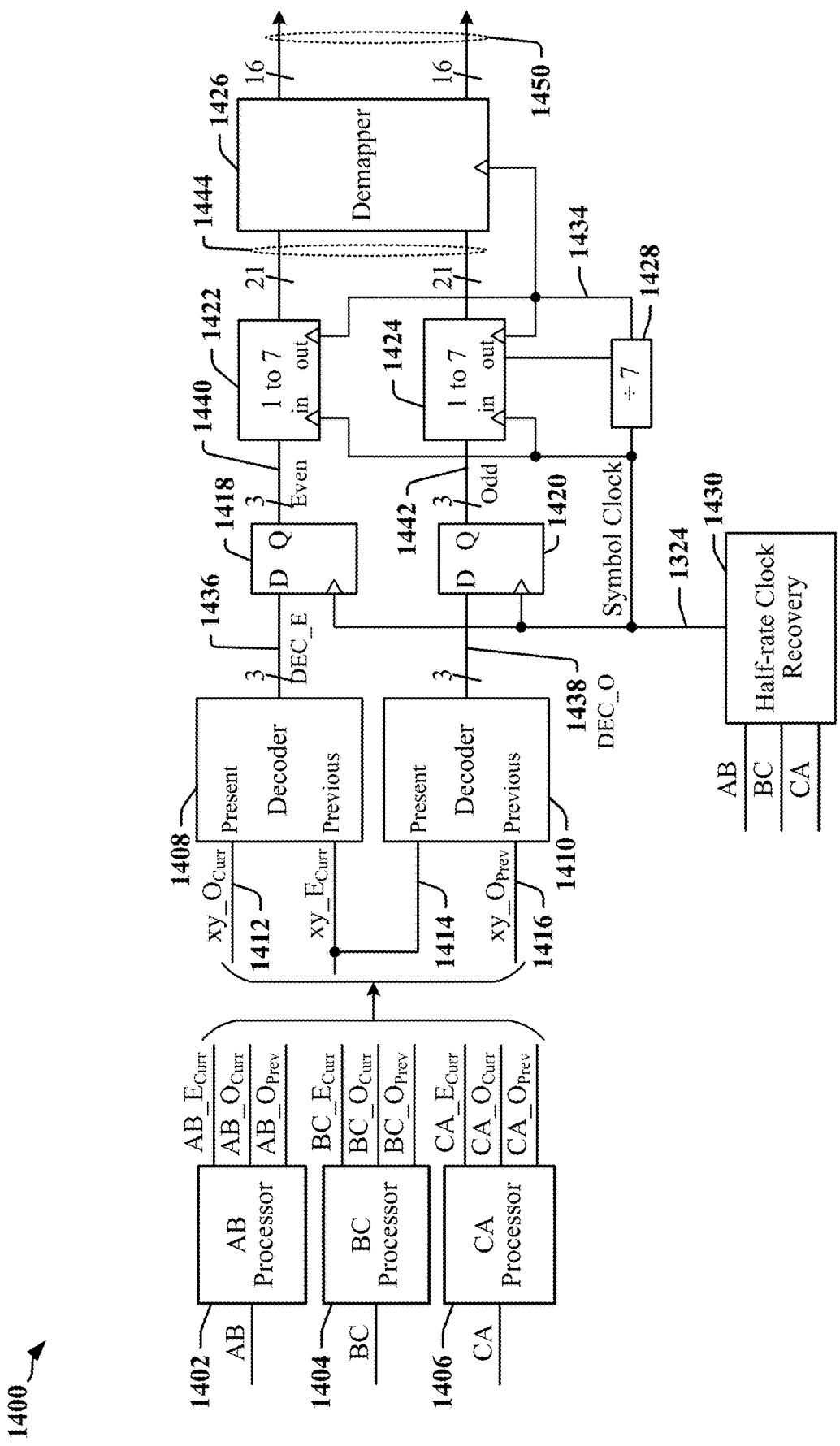
FIG. 14 illustrates a receiver circuit configured to use a half-rate symbol clock signal to decode data from signaling state of a C-PHY bus in accordance with certain aspects disclosed herein.

FIG. 14 illustrates a receiver circuit 1400 configured to use a half-rate symbol clock signal 1324 to decode data 1450 from signaling state of a C-PHY bus. The receiver circuit 1400 is implemented with an even symbol path and an odd symbol path, where each symbol corresponds to data encoded in transitions between successive signaling states. Each even symbol represents a first signaling state that is immediately followed by a second signaling state represented by an odd symbol and each odd symbol represents a third signaling state that is immediately followed by a fourth signaling state represented by an even symbol. The sequence of symbols complies with C-PHY protocols. FIG. 15 illustrates timing associated with the receiver circuit 1400.

The receiver circuit 1400 may include or may be coupled to comparators such as the set of comparators 802 illustrated in FIG. 8. The comparators provide a set of difference signals {AB, BC, CA} representing the difference in signaling state of the trio of wires (referenced as wires A, B and C) in a C-PHY bus. Three difference signal processors 1402, 1404, 1406 are provided to extract information from signaling states in a sequence of symbol transmission intervals on the C-PHY bus. The symbol transmission interval is defined by the symbol transmission rate. The set of difference signals is also provided to a clock recovery circuit 1430 that generates the half-rate symbol clock signal 1324. Each period of the half-rate symbol clock signal 1324 defines two symbol transmission intervals.

The AB difference signal processor 1402 provides the current even AB states, the current odd AB states and the previous odd AB states to a pair of wire state decoders. The BC difference signal processor 1404 provides the current even BC states, the current odd BC states and the previous odd BC states to a pair of wire state decoders. The CA difference signal processor 1406 provides the current even CA states, the current odd CA states and the previous odd CA states to a pair of wire state decoders.

An even wire state decoder 1408 provides 3-bit even FRP symbols 1436 by determining differences between the current odd states 1412 for the AB, BC and CA difference signals and the current even states 1414 for the AB, BC and CA difference signals. The current even states 1414 for the AB, BC and CA difference signals occur before the current odd states 1412 for the AB, BC and CA. An odd wire state decoder 1410 provides 3-bit odd FRP symbols 1438 by determining differences between the current even states 1414 for the AB, BC and CA difference signals and the previous odd states 1416 for the AB, BC and CA difference signals. The previous odd states 1416 for the AB, BC and CA difference signals occur before the current even states 1414 for the AB, BC and CA.

The even FRP symbols 1436 and the odd FRP symbols 1438 are held in corresponding registers or flipflops 1418 and 1420 respectively to provide even FRP input 1440 and odd FRP input 1442 to 1-to-7 serial-to-parallel converters 1422, 1424. The registers or flipflops 1418 and 1420 and the inputs of the serial-to-parallel converters 1422, 1424 are clocked by the half-rate symbol clock signal 1324. The serial-to-parallel converters 1422, 1424 provide 21-bit representations of sequences of symbols as even and odd inputs 1444 to a demapper 1426 based on timing provided by a data clock signal 1434 provided by a circuit 1428 that divides the half-rate symbol clock signal 1324 by seven. The demapper 1426 interleaves and decodes the even and odd inputs 1444 to obtain decoded data 1450, which may be output in 16-bit or 32-bit words. The serial-to-parallel converters 1422, 1424 and the demapper 1426 may operate based on timing provided by the data clock signal 1434.

Figure 16:
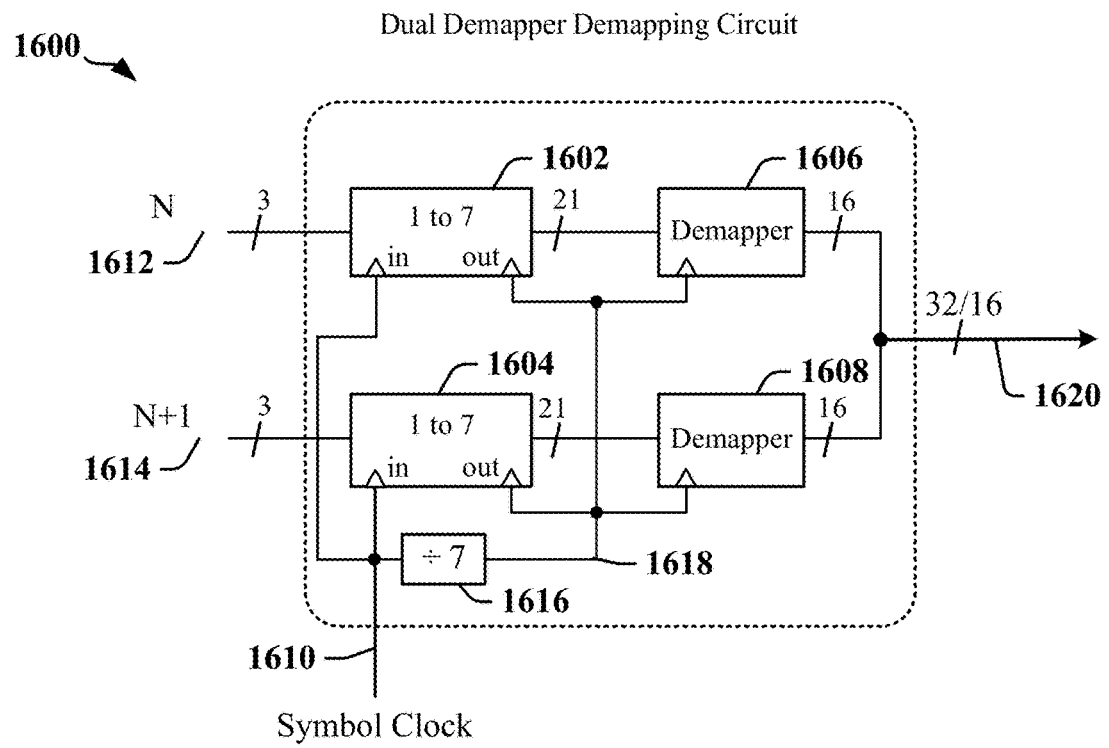
FIG. 16 illustrates examples of demapping circuits implemented with a dual path architecture in accordance aspects of the disclosure.
Figure 16:
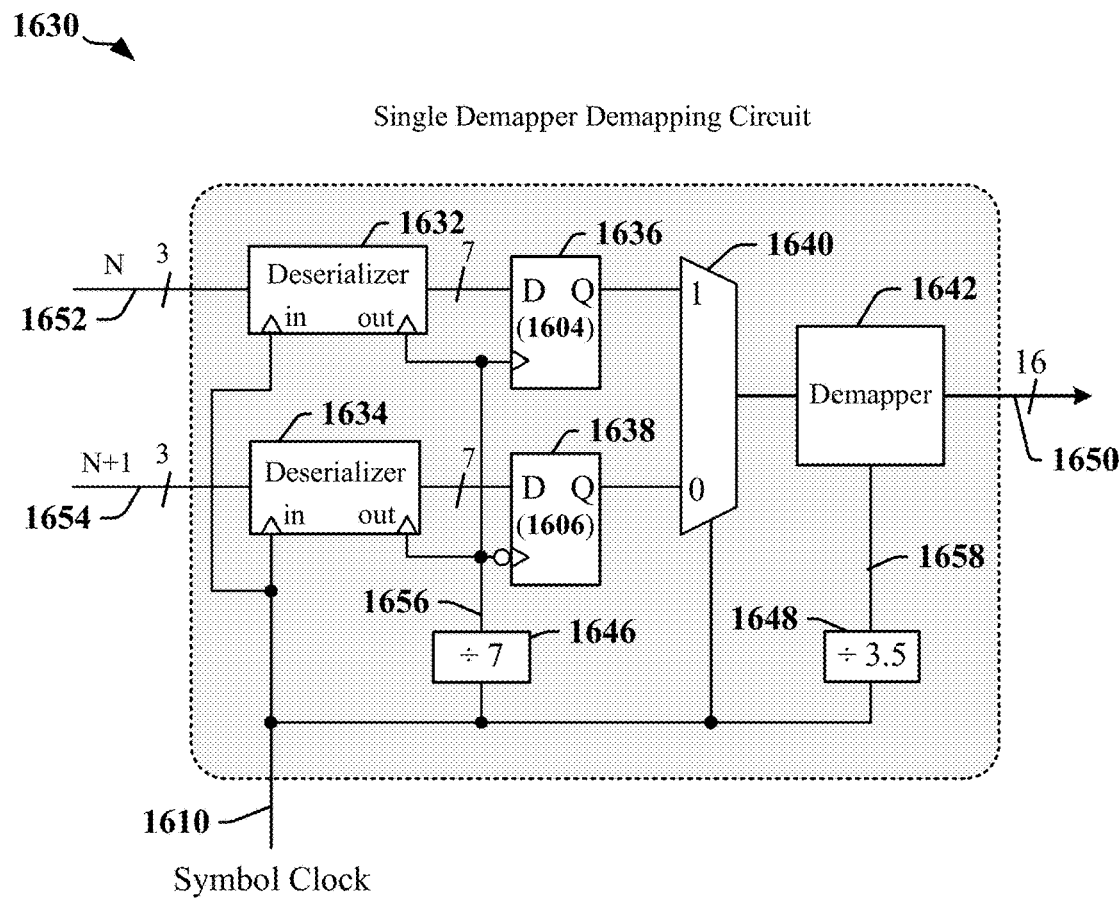

FIG. 16 illustrates examples of demapping circuits 1600, 1630 that may be implemented in C-PHY receivers that are configured with a dual path architecture in accordance aspects of the disclosure. The first demapping circuit 1600 includes two demappers 1606, 1608. A first deserializer 1602, or serial to parallel convertor, provides the first demapper 1606 with a 21-bit representation of each sequence of seven 3-bit symbols received from the even symbol path 1612. A second deserializer 1604 provides the second demapper 1608 with a 21-bit representation of each sequence of seven 3-bit symbols received from the odd symbol path 1614. The symbols received from the even symbol path 1612 and the odd symbol path 1614 may be configured as FRP symbols. The demappers 1606, 1608 may be configured to convert the 7-symbol sequences into data in accordance with C-PHY encoding. In some implementations, each of the demappers 1606, 1608 may decode a sequence of seven symbols by indexing a lookup table using the 21-bit representation of the sequence of seven symbols. In one example, the first demapping circuit 1600 may provide output data 1620 as two 16-bit words. In another example, the first demapping circuit 1600 may provide output data 1620 as two 16-bit words. or as a single 32-bit word.

The deserializers 1602, 1604 receive one symbol per clock cycle of a half-rate symbol clock signal 1610, which has a frequency equal to half the desired symbol transmission rate. In the illustrated example, each of the two demappers 1606, 1608 receive a set of seven 3-bit FRP symbols from corresponding deserializers 1602, 1604. Timing of the operation of the demappers 1606, 1608 and the output of the deserializers 1602, 1604 is controlled by a word clock signal 1618 provided by a circuit 1616 that divides the half-rate symbol clock signal 1610 by seven. In the illustrated example, FRP symbol N is received from the even symbol path 1612 and symbol N+1 is received from the odd symbol path 1614, where symbol N+1 is received from the C-PHY bus after symbol N.

In some implementations, each of the two demappers 1606, 1608 may be configured as an even demapper 1606 and an odd demapper 1608, both demappers 1606, 1608 being configured to output parts of the same 32-bit word. In some implementations, signaling on the serial bus is consistent with conventional C-PHY transmitters.

The second demapping circuit 1630 uses a single demapper 1642 and is configured to interleave symbols received from the even symbol path 1652 and the odd symbol path 1654. In one example, the sequences of 7 FRP symbols are captured from deserializers 1632, 1634 by sets of flipflops 1636, 1638, where the sets of flipflops 1636, 1638 and the outputs of the deserializers 1632, 1634 are controlled by a word clock signal 1656, which may be obtained from a divider 1646 that divides the half-rate symbol clock signal 1610 by 7. In one example, the deserializers 1632, 1634 are configured to assemble up to 7 received symbols into a sequence of symbols captured by respective sets of flipflops 1636, 1638. A first set of flipflops 1636 captures 7-symbol sequences from the even symbol path 1652 and a second set of flipflops 1638 captures 7-symbol sequences from the odd symbol path 1654. A multiplexer 1640 feeds the demapper 1642 in accordance with a select signal provided by a half-word clock signal 1658, which may be obtained from a divider 1648 that divides the half-rate symbol clock signal 1610 by 3.5. The demapper 1642 produces two 16-bit data words at an output 1650 of the second demapping circuit 1630 for every cycle of the half-rate symbol clock signal 1610. In one example, a first 16-bit data word is decoded from a 7-symbol sequence processed through the even symbol path 1652 and a second 16-bit data word is decoded from a 7-symbol sequence processed through the odd symbol path 1654.

Examples of Processing Circuits and Methods

Figure 17:
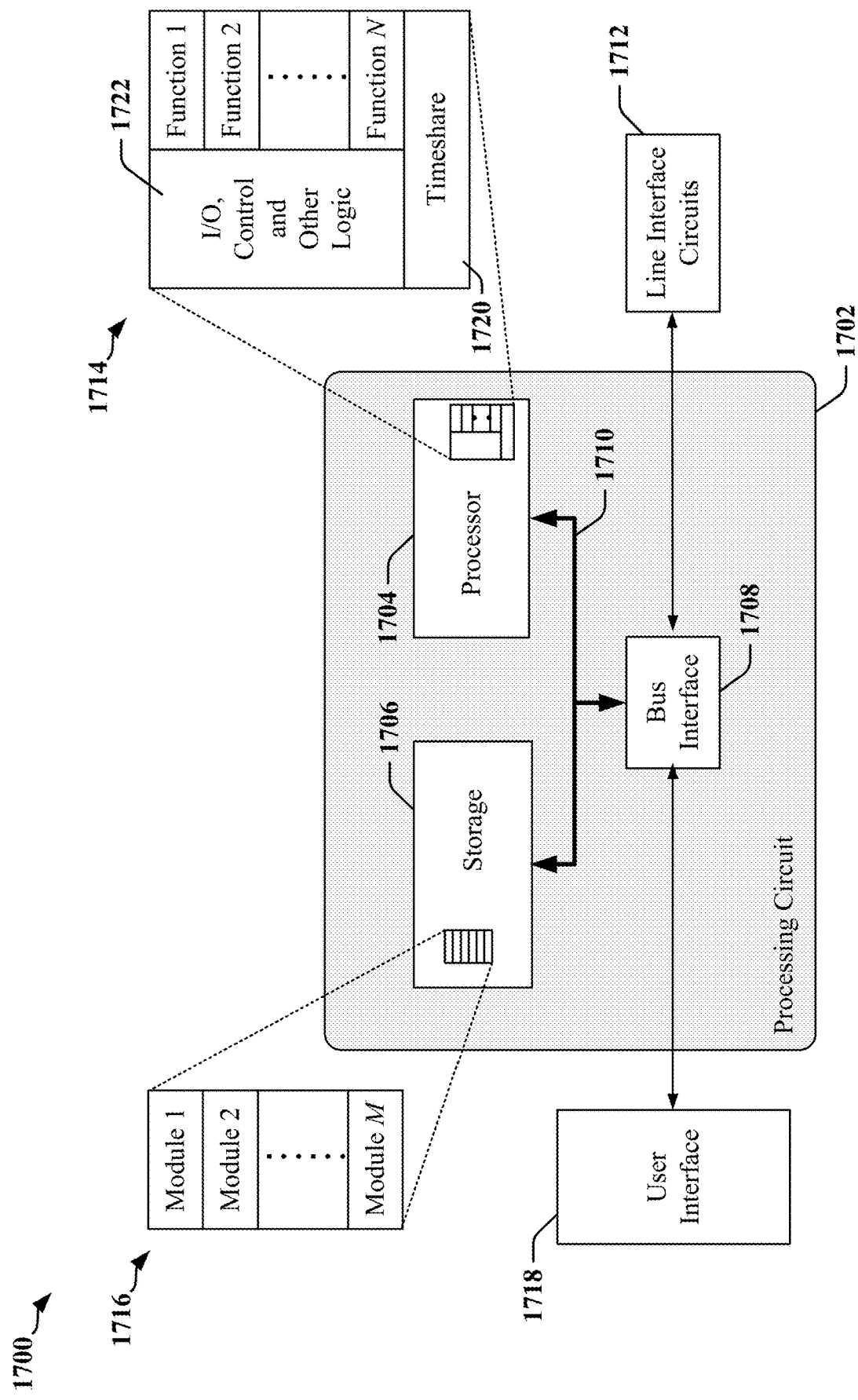
FIG. 17 illustrates an example of an apparatus employing a processing circuit that may be adapted according to certain aspects disclosed herein.

FIG. 17 is a conceptual diagram 1700 illustrating an example of a hardware implementation for an apparatus employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include certain devices, circuits, and/or logic that support the various encoding schemes disclosed herein. In one example, the processing circuit 1702 may include some combination of circuitry and modules that facilitates the encoding of data into symbols, and line drivers that are adapted to assert three or more voltage levels on the wires of a serial bus. In another example, the processing circuit 1702 may include some combination of circuitry and modules that facilitates the encoding of data into symbols using 3-phase encoders, mappers, drivers and/or equalizers. The processing circuit 1702 may include a state machine or another type of processing device that manages encoding and/or decoding processes as disclosed herein.

The processing circuit 1702 may include one or more processors 1704 that are controlled by some combination of hardware and software modules. Examples of processors 1704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and a processor-readable storage medium 1706. The processor-readable storage medium 1706 may include memory devices and mass storage devices and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712. A transceiver 1712 may be provided for each networking technology supported by the processing circuit. In some instances, multiple networking technologies may share some or all of the circuitry or processing modules found in a transceiver 1712. Each transceiver 1712 provides a means for communicating with various other apparatus over a transmission medium. Depending upon the nature of the apparatus, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a processor-readable medium that may include the processor-readable storage medium 1706. In this respect, the processing circuit 1702, including the processor 1704, may be used to implement any of the methods, functions and techniques disclosed herein. The processor-readable storage medium 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 1706 or in another, external processor-readable medium. The processor-readable storage medium 1706 may include a non-transitory processor-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The processor-readable storage medium 1706 may also include, by way of example, a carrier wave, a transmission line, and any other suitable medium for transmitting software and/or instructions that may be accessed and read by a computer. Processor-readable storage medium 1706 may reside in the processing circuit 1702, in the processor 1704, external to the processing circuit 1702, or be distributed across multiple entities including the processing circuit 1702. The processor-readable storage medium 1706 may be embodied in a computer program product. By way of example, a computer program product may include a processor-readable medium in packaging materials. Those skilled in the art will recognize how best to implement the described functionality presented throughout this disclosure depending on the particular application and the overall design constraints imposed on the overall system.

The processor-readable storage medium 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704 and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
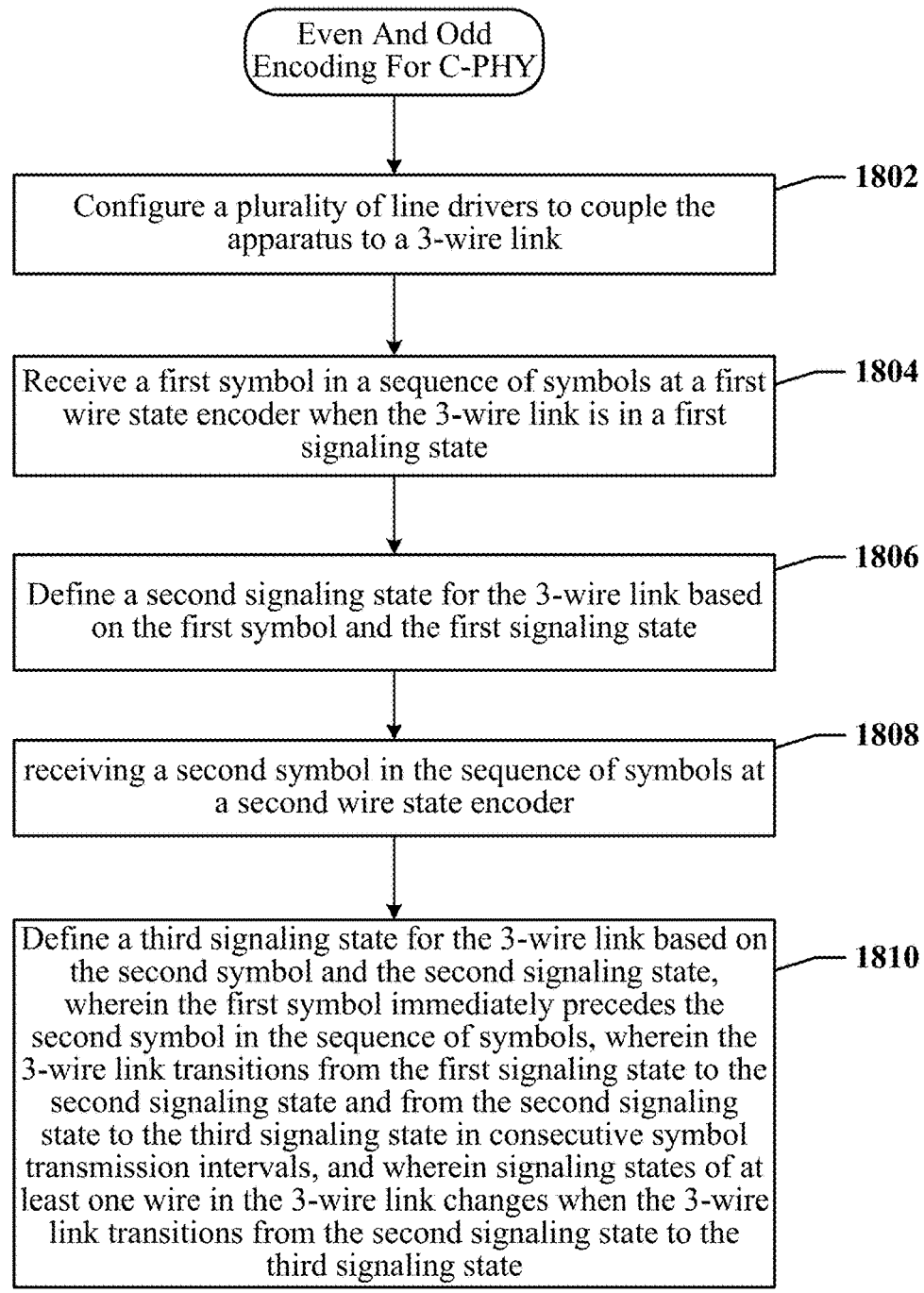
FIG. 18 is a flow chart of a method performed at a transmitter according to certain aspects disclosed herein.

FIG. 18 is a flow chart 1800 of a data communication method that may be performed at a transmitter coupled to a multi-wire communication link. In one example, the communication link may have three wires and data may be encoded in phase state and amplitude of a signal transmitted in different phases on each of the three wires. The method may be performed, at least in part, at the transmitter 1000 or 1200 illustrated in FIGS. 10 and 12 respectively.

At block 1802, the transmitter 1000 or 1200 may configure a plurality of line drivers to couple the apparatus to a 3-wire link. At block 1804, the transmitter 1000 or 1200 may receive a first symbol in a sequence of symbols at a first wire state encoder when the 3-wire link is in a first signaling state. At block 1806, the transmitter 1000 or 1200 may define a second signaling state for the 3-wire link based on the first symbol and the first signaling state. At block 1808, the transmitter 1000 or 1200 may receive a second symbol in the sequence of symbols at a second wire state encoder. At block 1810, the transmitter 1000 or 1200 may define a third signaling state for the 3-wire link based on the second symbol and the second signaling state. The first symbol may immediately precede the second symbol in the sequence of symbols. The 3-wire link transitions from the first signaling state to the second signaling state and from the second signaling state to the third signaling state in consecutive symbol transmission intervals. Signaling states of at least one wire in the 3-wire link changes when the 3-wire link transitions from the second signaling state to the third signaling state.

In one example, each of the first wire state encoder and the second wire state encoder defines signaling states for the 3-wire link every two symbol transmission intervals.

In certain examples, a half-rate symbol clock signal that has a period twice the duration of each symbol transmission interval may be provided. The transmitter 1000 or 1200 may select between the second signaling state and the third signaling state to provide wire state information to a driver control circuit that controls the plurality of line drivers. Selection may be based on phase of the half-rate symbol clock signal. The transmitter 1000 or 1200 may clock first flipflops clocked using an inverse of the half-rate symbol clock signal. The first flipflops may be configured to capture first control signals representative of the second signaling state. The transmitter 1000 or 1200 may clock second flipflops using the half-rate symbol clock signal. The second flipflops may be configured to capture second control signals representative of the third signaling state. The transmitter 1000 or 1200 may provide the first control signals or the second control signals as the wire state information. The transmitter 1000 or 1200 may map at least 16 bits of data to at least 7 symbols in the sequence of symbols. The 3-wire link may be operated in accordance with a C-PHY protocol.

In some implementations, the transmitter 1000 or 1200 may configure the plurality of line drivers when initiating transmission of the third signaling state based on differences between the second signaling state and the third signaling state.

Figure 19:
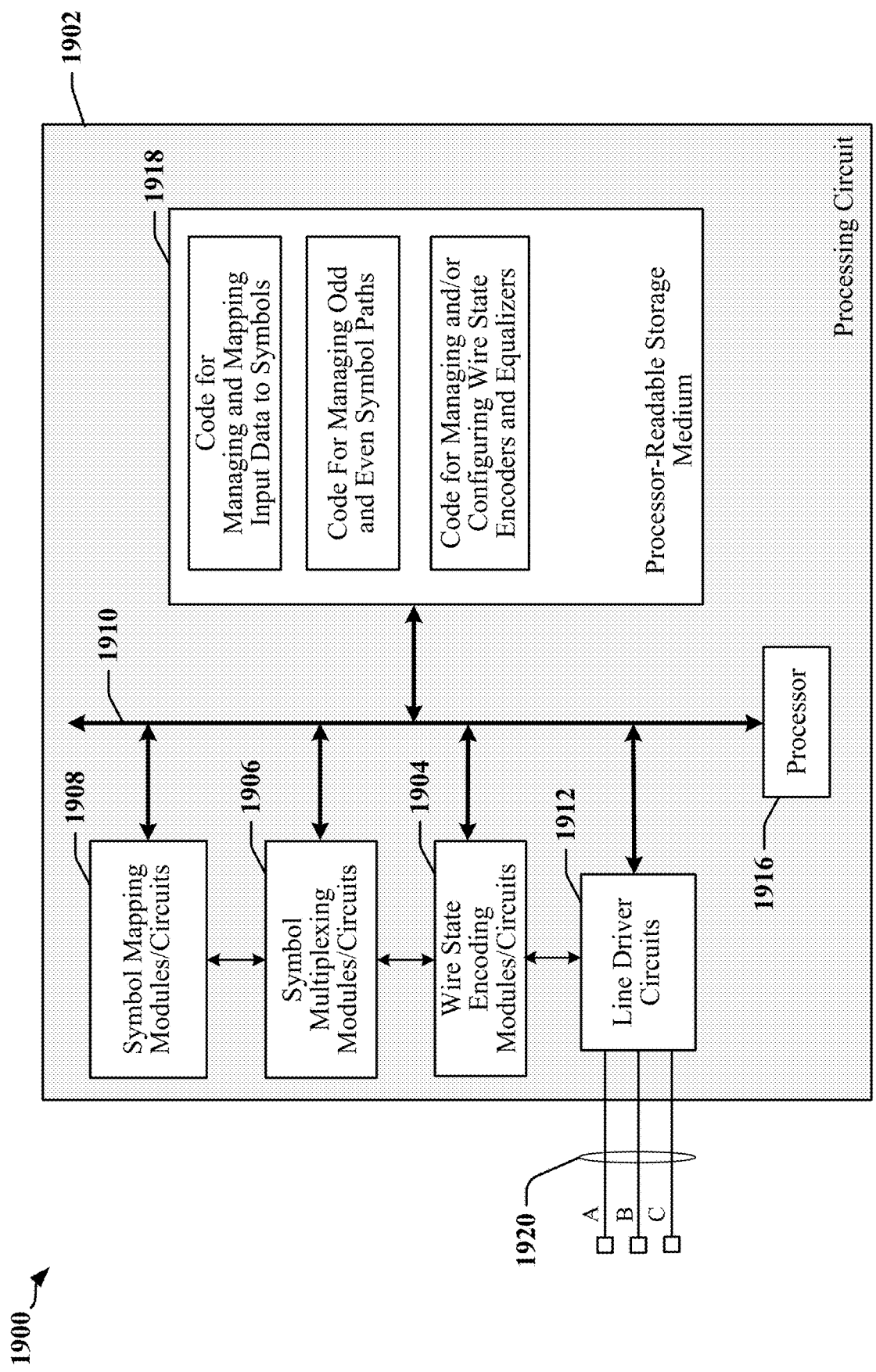
FIG. 19 is a diagram illustrating an example of a hardware implementation for a receiving apparatus in accordance with certain aspects disclosed herein.

FIG. 19 is a diagram illustrating an example of a hardware implementation for an apparatus 1900 employing a processing circuit 1902. The processing circuit 1902 typically has a processor 1916, which may be a microprocessor, microcontroller, digital signal processor, a sequencer or a state machine. The processing circuit 1902 may be implemented with a bus architecture, represented generally by the bus 1910. The bus 1910 may include any number of interconnecting buses and bridges depending on the specific application of the processing circuit 1902 and the overall design constraints. The bus 1910 links together various circuits including one or more processors and/or hardware modules, represented by the processor 1916, the modules or circuits 1904, 1906 and 1908, line drivers 1912 that are configured to drive the wires of a 3-wire link 1920, and the processor-readable storage medium 1918. The bus 1910 may also link various other circuits such as timing sources, peripherals, voltage regulators, and power management circuits, which are well known in the art, and therefore, will not be described any further.

The processor 1916 is responsible for general processing, including the execution of software stored on the processor-readable storage medium 1918. The software, when executed by the processor 1916, causes the processing circuit 1902 to perform the various functions described supra for any particular apparatus. The processor-readable storage medium 1918 may include transitory and/or non-transitory media, which may be used for storing data that is manipulated by the processor 1916 when executing software, including symbol tables and intermediate indices used to access the symbol tables. The processing circuit 1902 further includes at least one of the modules 1904, 1906 and 1908. The modules 1904, 1906 and 1908 may be implemented as software modules running in the processor 1916, resident/stored in the processor-readable storage medium 1918, one or more hardware modules coupled to the processor 1916, or some combination thereof. The modules 1904, 1906 and/or 1908 may include microcontroller instructions, state machine configuration parameters, or some combination thereof.

In one configuration, the apparatus 1900 may be configured for data communication over a multi-wire interface. The apparatus 1900 may include symbol mapping modules and/or circuits 1908 configured to encode data in odd and even symbols using 3-phase encoding. The apparatus 1900 may include symbol multiplexing modules and/or circuits 1906 configured to merge or interleave the odd and even symbols to obtain a sequence of symbols. The apparatus 1900 may include wire state encoding modules and/or circuits 1904 that are configured to use the sequence of symbols to cause the line drivers 1912 to configure the signaling state of the 3-wire link 1920 during corresponding symbol transmission intervals. In one example, the line drivers 1912 provide 7 or more signaling states on each wire, and each wire is driven to a different signaling state than the other wires in the 3-wire link 1920.

In one example, the apparatus 1900 has a pair of wire state encoders and the line drivers 1912 are configured to couple the apparatus to the 3-wire link 1920. A first wire state encoder is configured to receive a first symbol in a sequence of symbols when the 3-wire link 1920 is in a first signaling state, and to define a second signaling state for the 3-wire link based on the first symbol and the first signaling state. The second wire state encoder is configured to receive a second symbol in the sequence of symbols, and to define a third signaling state for the 3-wire link based on the second symbol and the second signaling state. The first symbol immediately precedes the second symbol in the sequence of symbols. The 3-wire link 1920 transitions from the first signaling state to the second signaling state and from the second signaling state to the third signaling state in consecutive symbol transmission intervals. Signaling states of at least one wire in the 3-wire link 1920 changes when the 3-wire link 1920 transitions from the second signaling state to the third signaling state. In one example, each wire state encoder defines signaling states for the 3-wire link 1920 every two symbol transmission intervals.

In some implementations, the apparatus 1900 has a clock generation circuit configured to provide a half-rate symbol clock signal that has a period twice the duration of each symbol transmission interval. The apparatus may have a driver control circuit configured to control the line drivers 1912, and a multiplexer that selects between the second signaling state and the third signaling state to provide wire state information to the driver control circuit. The multiplexer may select between the second signaling state and the third signaling state based on phase of the half-rate symbol clock signal. The apparatus 1900 may further include first flipflops clocked by an inverse of the half-rate symbol clock signal and configured to capture first control signals representative of the second signaling state, and second flipflops clocked by the half-rate symbol clock signal and configured to capture second control signals representative of the third signaling state. The multiplexer may be further configured to provide the first control signals or the second control signals as the wire state information.

In some implementations, the apparatus 1900 has one or more mappers configured to map at least 16 bits of data to at least 7 symbols in the sequence of symbols. The 3-wire link 1620 may be operated in accordance with a C-PHY protocol.

In some implementations the apparatus 1900 has an equalizer circuit configured to receive delayed versions of the second signaling state and the third signaling state, and to configure the plurality of line drivers when initiating transmission of the third signaling state based on differences between the second signaling state and the third signaling state.

The processor-readable storage medium 1918 may store instructions and other information related to the method illustrated in FIG. 18. For example, the processor-readable storage medium 1918 may include instructions that cause the processing circuit 1902 to configure the line drivers 1912 to couple the apparatus to the 3-wire link 1920, receive a first symbol in a sequence of symbols at a first wire state encoder when the 3-wire link 1920 is in a first signaling state, define a second signaling state for the 3-wire link 1920 based on the first symbol and the first signaling state, receive a second symbol in the sequence of symbols at a second wire state encoder, and define a third signaling state for the 3-wire link based on the second symbol and the second signaling state. The first symbol immediately precedes the second symbol in the sequence of symbols. The 3-wire link 1920 transitions from the first signaling state to the second signaling state and from the second signaling state to the third signaling state in consecutive symbol transmission intervals. Signaling states of at least one wire in the 3-wire link 1920 may change when the 3-wire link 1920 transitions from the second signaling state to the third signaling state.

In some instances, each of the first wire state encoder and the second wire state encoder defines signaling states for the 3-wire link 1920 every two symbol transmission intervals.

In some implementations, the processor-readable storage medium 1918 includes instructions that cause the processing circuit 1902 to provide a half-rate symbol clock signal that has a period twice the duration of each symbol transmission interval. The processor-readable storage medium 1918 may include instructions that cause the processing circuit 1902 to select between the second signaling state and the third signaling state to provide wire state information to a driver control circuit that controls the plurality of line drivers. Selection may be based on phase of the half-rate symbol clock signal. The processor-readable storage medium 1918 may include instructions that cause the processing circuit 1902 to clock first flipflops clocked using an inverse of the half-rate symbol clock signal, where the first flipflops are configured to capture first control signals representative of the second signaling state. The processor-readable storage medium 1918 may include instructions that cause the processing circuit 1902 to clock second flipflops using the half-rate symbol clock signal, where the second flipflops are configured to capture second control signals representative of the third signaling state, and provide the first control signals or the second control signals as the wire state information.

The processor-readable storage medium 1918 may include instructions that cause the processing circuit 1902 to map at least 16 bits of data to at least 7 symbols in the sequence of symbols. The 3-wire link 1920 may be operated in accordance with a C-PHY protocol. The processor-readable storage medium 1918 may include instructions that cause the processing circuit 1902 to configure the plurality of line drivers when initiating transmission of the third signaling state based on differences between the second signaling state and the third signaling state.

Figure 20:
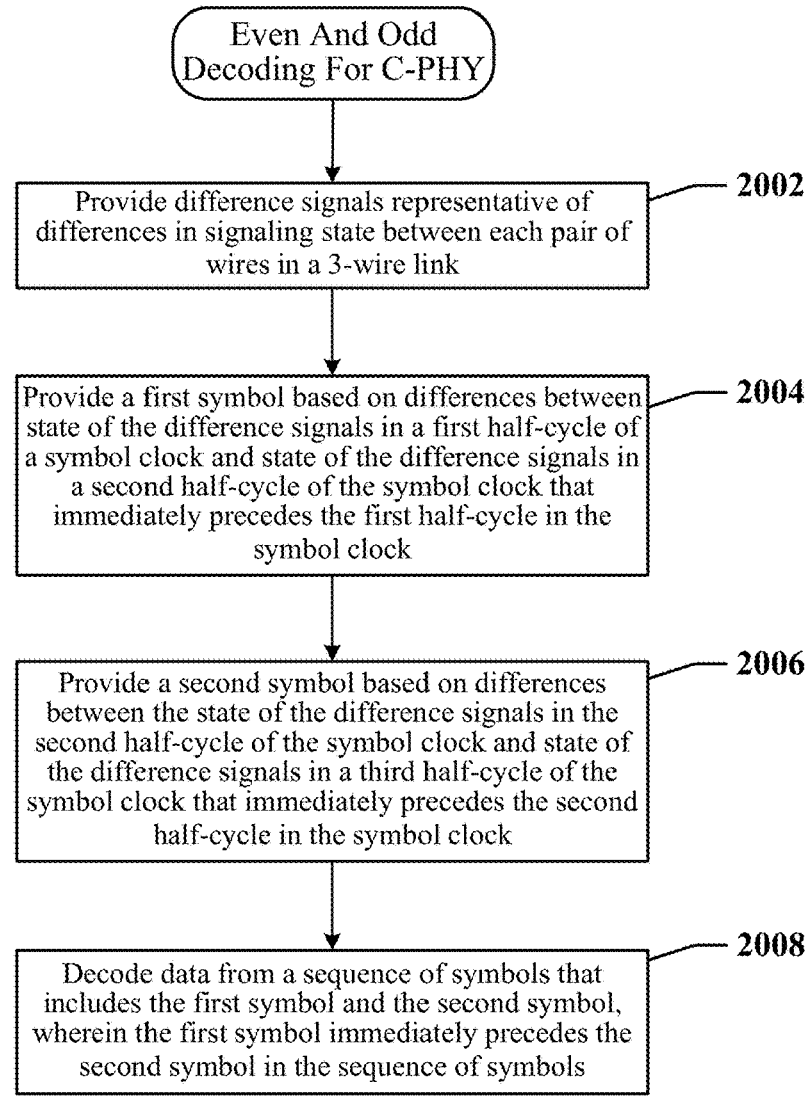
FIG. 20 is a flow chart of a method performed at a receiver according to certain aspects disclosed herein.

FIG. 20 is a flow chart 2000 of a data communication method that may be performed at a receiver coupled to a multi-wire communication link. In one example, data may be encoded in phase state and amplitude of a signal transmitted in different phases on each of the three wires in a 3-wire link 1920. The method may be performed, at least in part, at the receiver circuit 1400 illustrated in FIG. 14.

At block 2002, the receiver circuit 1400 may provide difference signals representative of differences in signaling state between each pair of wires in the 3-wire link 1920. At block 2004, the receiver circuit 1400 may provide a first symbol based on differences between state of the difference signals in a first half-cycle of a symbol clock and state of the difference signals in a second half-cycle of the symbol clock that immediately precedes the first half-cycle in the symbol clock. At block 2006, the receiver circuit 1400 may provide a second symbol based on differences between the state of the difference signals in the second half-cycle of the symbol clock and state of the difference signals in a third half-cycle of the symbol clock that immediately precedes the second half-cycle in the symbol clock. At block 2008, the receiver circuit 1400 may decode data from a sequence of symbols that includes the first symbol and the second symbol. The first symbol immediately precedes the second symbol in the sequence of symbols.

In various examples, the signaling state of at least one difference signal changes at each transition between half-cycles of the half-rate symbol clock. The method may include deriving the symbol clock from the difference signals. The 3-wire link 1920 is operated in accordance with a C-PHY protocol. The method may include providing, for each difference signal, a first signal representing the state of the corresponding difference signal in the first half-cycle of the symbol clock, a second signal representing the state of the corresponding difference signal in the second half-cycle of the symbol clock, and a third signal representing the state of the corresponding difference signal in the third half-cycle of the symbol clock. The method may include decoding a 16-bit word from each of a plurality of sequences of seven symbols or decoding a 32-bit word from each pair of sequences of seven symbols generated concurrently by the first wire state decoder and the second wire state decoder.

Figure 21:
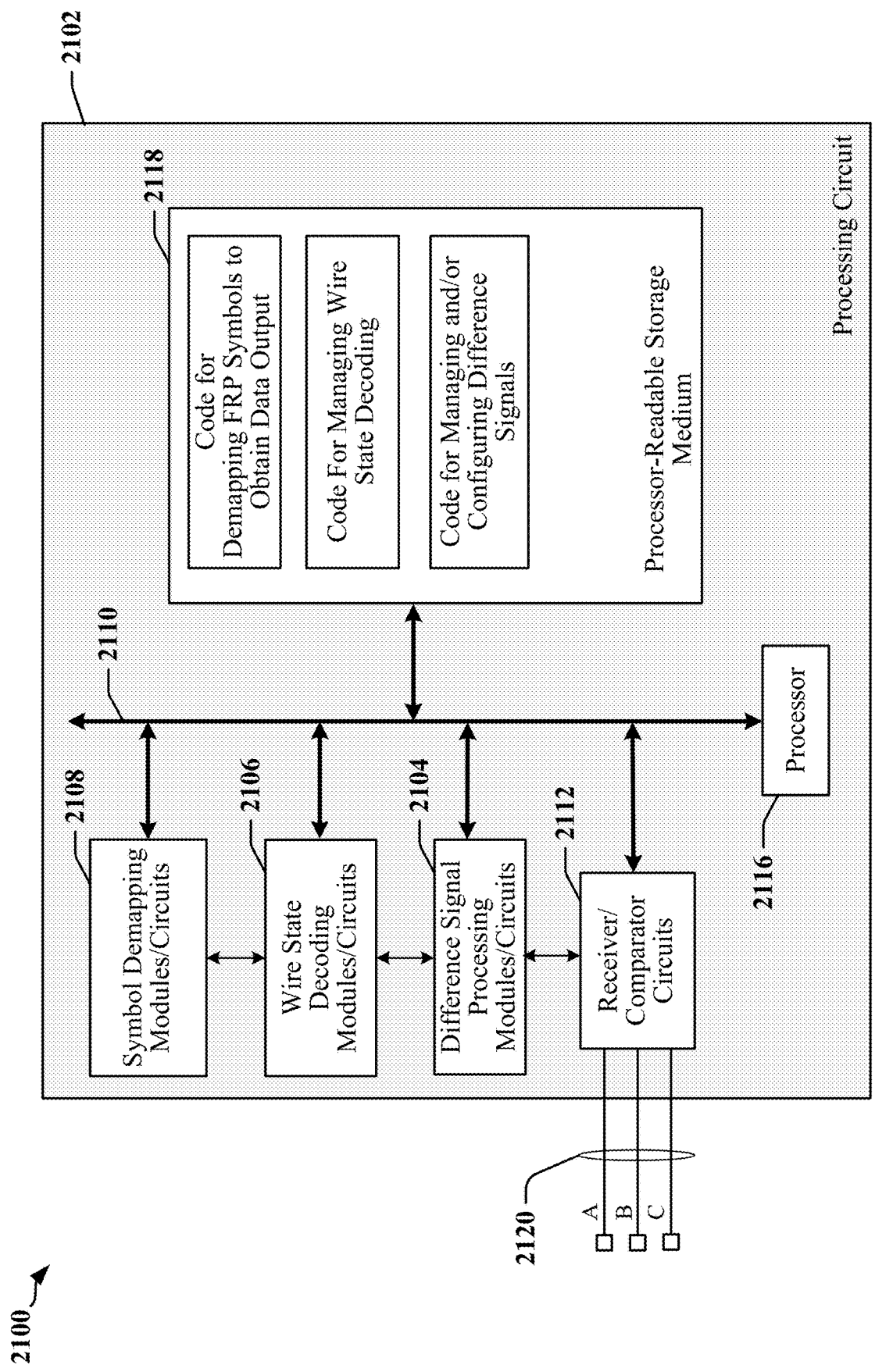
FIG. 21 is a diagram illustrating an example of a hardware implementation for a receiving apparatus in accordance with certain aspects disclosed herein.

FIG. 21 is a diagram illustrating an example of a hardware implementation for an apparatus 2100 employing a processing circuit 2102. The processing circuit 2102 typically has a processor 2116, which may be a microprocessor, microcontroller, digital signal processor, a sequencer or a state machine. The processing circuit 2102 may be implemented with a bus architecture, represented generally by the bus 2110. The bus 2110 may include any number of interconnecting buses and bridges depending on the specific application of the processing circuit 2102 and the overall design constraints. The bus 2110 links together various circuits including one or more processors and/or hardware modules, represented by the processor 2116, the modules or circuits 2104, 2106 and 2108, receivers 2112 that are configured to drive the wires of a 3-wire link 2120, and the processor-readable storage medium 2118. The bus 2110 may also link various other circuits such as timing sources, peripherals, voltage regulators, and power management circuits, which are well known in the art, and therefore, will not be described any further.

The processor 2116 is responsible for general processing, including the execution of software stored on the processor-readable storage medium 2118. The software, when executed by the processor 2116, causes the processing circuit 2102 to perform the various functions described supra for any particular apparatus. The processor-readable storage medium 2118 may include transitory and/or non-transitory media, which may be used for storing data that is manipulated by the processor 2116 when executing software, including symbol tables and intermediate indices used to access the symbol tables. The processing circuit 2102 further includes at least one of the modules 2104, 2106 and 2108. The modules 2104, 2106 and 2108 may be implemented as software modules running in the processor 2116, resident/stored in the processor-readable storage medium 2118, one or more hardware modules coupled to the processor 2116, or some combination thereof. The modules 2104, 2106 and/or 2108 may include microcontroller instructions, state machine configuration parameters, or some combination thereof.

In one configuration, the apparatus 2100 may be configured for data communication over the 3-wire link 2120. The 3-wire link may be operated in accordance with a C-PHY protocol. The apparatus 2100 may include difference signal processing modules and/or circuits 2104 that are configured to determine differences in signaling state between pairs of wires in the 3-wire link 2120. In one example, the receivers 2112 determine differences between 7 or more signaling states on each wire. The apparatus 2100 may include wire state decoding modules and/or circuits 2106 configured to produce odd and even symbols representative of difference signals in each symbol transmission interval. The apparatus 2100 may include symbol demapping modules and/or circuits 2108 configured to decode data from the odd and even symbols.

In one example, the receivers 2112 are configured to provide difference signals representative of differences in signaling state between each pair of wires in the 3-wire link 2120, and the apparatus 2100 has a first wire state decoder configured to provide a first symbol based on differences between state of the difference signals in a first half-cycle of a symbol clock and state of the difference signals in a second half-cycle of the symbol clock that immediately precedes the first half-cycle in the symbol clock, and a second wire state decoder configured to provide a second symbol based on differences between the state of the difference signals in the second half-cycle of the symbol clock and state of the difference signals in a third half-cycle of the symbol clock that immediately precedes the second half-cycle in the symbol clock. The apparatus 2100 may have a demapper configured to decode data from a sequence of symbols that includes the first symbol and the second symbol. The first symbol immediately precedes the second symbol in the sequence of symbols.

In some implementations, signaling state of at least one difference signal changes at each transition between half-cycles of the half-rate symbol clock. A clock recovery circuit may be configured to derive the symbol clock from the difference signals.

In one example, the apparatus 2100 has a plurality of difference signal processors, each difference signal processor coupled to an associated difference signal and configured to provide a first signal representing the state of the corresponding difference signal in the first half-cycle of the symbol clock, a second signal representing the state of the corresponding difference signal in the second half-cycle of the symbol clock, and a third signal representing the state of the corresponding difference signal in the third half-cycle of the symbol clock.

In one example, the demapper is further configured to decode a 16-bit word from each of a plurality of sequences of seven symbols, or decode a 32-bit word from each pair of sequences of seven symbols generated concurrently by the first wire state decoder and the second wire state decoder.

The processor-readable storage medium 2118 may store instructions and other information related to the method illustrated in FIG. 20. For example, the processor-readable storage medium 2118 may include instructions that cause the processing circuit 2102 to provide difference signals representative of differences in signaling state between each pair of wires in a 3-wire link 2120, provide a first symbol based on differences between state of the difference signals in a first half-cycle of a symbol clock and state of the difference signals in a second half-cycle of the symbol clock that immediately precedes the first half-cycle in the symbol clock, provide a second symbol based on differences between the state of the difference signals in the second half-cycle of the symbol clock and state of the difference signals in a third half-cycle of the symbol clock that immediately precedes the second half-cycle in the symbol clock, and decode data from a sequence of symbols that includes the first symbol and the second symbol. The first symbol immediately precedes the second symbol in the sequence of symbols.

In some examples, signaling state of at least one difference signal changes at each transition between half-cycles of the half-rate symbol clock. The storage medium 2118 may include instructions that cause the processing circuit 2102 to derive the symbol clock from the difference signals. The 3-wire link 2120 may be operated in accordance with a C-PHY protocol.

The storage medium 2118 may include instructions that cause the processing circuit 2102 to provide, for each difference signal, a first signal representing the state of the corresponding difference signal in the first half-cycle of the symbol clock, a second signal representing the state of the corresponding difference signal in the second half-cycle of the symbol clock, and a third signal representing the state of the corresponding difference signal in the third half-cycle of the symbol clock.

The storage medium 2118 may include instructions that cause the processing circuit 2102 to decode a 16-bit word from each of a plurality of sequences of seven symbols, or decode a 32-bit word from each pair of sequences of seven symbols generated concurrently by the first wire state decoder and the second wire state decoder.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A data communication apparatus, comprising:
   a plurality of receivers configured to provide difference signals representative of differences in signaling state between each pair of wires in a 3-wire link;
   a first wire state decoder configured to provide a first symbol representative of differences between state of the difference signals in a first half-cycle of a symbol clock and state of the difference signals in a second half-cycle of the symbol clock that immediately precedes the first half-cycle in the symbol clock, wherein the first symbol corresponds to first data encoded in a first transition in signaling state of the 3-wire link that occurs between the first half-cycle of the symbol clock and the second half-cycle of the symbol clock;
   a second wire state decoder configured to provide a second symbol representative of differences between the state of the difference signals in the second half-cycle of the symbol clock and state of the difference signals in a third half-cycle of the symbol clock that immediately precedes the second half-cycle in the symbol clock, wherein the second symbol corresponds to second data encoded in a second transition in signaling state of the 3-wire link that occurs between the second half-cycle of the symbol clock and the third half-cycle of the symbol clock; and a demapper configured to decode data from a sequence of symbols that includes the first symbol and the second symbol, wherein the first symbol immediately precedes the second symbol in the sequence of symbols, and wherein timing of operation of the demapper is controlled by a word clock that is obtained by dividing the symbol clock by 3.5 or 7.

2. The data communication apparatus of claim 1 further comprising:
a multiplexer configured to feed the demapper, wherein the demapper outputs two 16-bit data words for every cycle of the symbol clock.

3. The data communication apparatus of claim 1, further comprising:
a clock recovery circuit configured to derive the symbol clock from the difference signals, wherein signaling state of at least one difference signal changes at each transition between half-cycles of the symbol clock.

4. The data communication apparatus of claim 1, further comprising:
a plurality of difference signal processors, each difference signal processor coupled to an associated difference signal and configured to provide a first signal representing the state of a corresponding difference signal in the first half-cycle of the symbol clock, a second signal representing the state of a corresponding difference signal in the second half-cycle of the symbol clock, and a third signal representing the state of a corresponding difference signal in the third half-cycle of the symbol clock.

5. The data communication apparatus of claim 1, wherein the demapper is further configured to:
decode a 16-bit word from each of a plurality of sequences of seven symbols.

6. The data communication apparatus of claim 1, wherein the demapper is further configured to:
decode a 32-bit word from each pair of sequences of seven symbols generated concurrently by the first wire state decoder and the second wire state decoder.

7. The data communication apparatus of claim 1, wherein the 3-wire link is operated in accordance with a C-PHY protocol.

8. A data communication method, comprising:
providing difference signals representative of differences in signaling state between each pair of wires in a 3-wire link;
providing a first symbol representative of differences between state of the difference signals in a first half-cycle of a symbol clock and state of the difference signals in a second half-cycle of the symbol clock that immediately precedes the first half-cycle in the symbol clock, wherein the first symbol corresponds to first data encoded in a first transition in signaling state of the 3-wire link that occurs between the first half-cycle of the symbol clock and the second half-cycle of the symbol clock;
providing a second symbol representative of differences between the state of the difference signals in the second half-cycle of the symbol clock and state of the difference signals in a third half-cycle of the symbol clock that immediately precedes the second half-cycle in the symbol clock, wherein the second symbol corresponds to second data encoded in a second transition in signaling state of the 3-wire link that occurs between the second half-cycle of the symbol clock and the third half-cycle of the symbol clock;
providing a sequence of symbols by selecting between the first symbol and the second symbol in accordance with state of the symbol clock, wherein the first symbol immediately precedes the second symbol in the sequence of symbols; and
decoding data from the sequence of symbols.

9. The data communication method of claim 8, wherein the symbol clock is derived from transitions in signaling state of the difference signals.

10. The data communication method of claim 8, further comprising:
deriving the symbol clock from the difference signals, wherein the 3-wire link is operated in accordance with a C-PHY protocol.

11. The data communication method of claim 8, further comprising:
for each difference signal, providing a first signal representing the state of a corresponding difference signal in the first half-cycle of the symbol clock, a second signal representing the state of a corresponding difference signal in the second half-cycle of the symbol clock, and a third signal representing the state of a corresponding difference signal in the third half-cycle of the symbol clock.

12. The data communication method of claim 8, further comprising:
decoding a 16-bit word from each of a plurality of sequences of seven symbols.

13. The data communication method of claim 8, further comprising:
decoding a 32-bit word from each pair of sequences of seven symbols generated concurrently by a first wire state decoder and a second wire state decoder.

14. A non-transitory processor-readable storage medium comprising code for:
providing difference signals representative of differences in signaling state between each pair of wires in a 3-wire link;
providing a first symbol representative of differences between state of the difference signals in a first half-cycle of a symbol clock and state of the difference signals in a second half-cycle of the symbol clock that immediately precedes the first half-cycle in the symbol clock, wherein the first symbol corresponds to first data encoded in a first transition in signaling state of the 3-wire link that occurs between the first half-cycle of the symbol clock and the second half-cycle of the symbol clock;
providing a second symbol representative of differences between the state of the difference signals in the second half-cycle of the symbol clock and state of the difference signals in a third half-cycle of the symbol clock that immediately precedes the second half-cycle in the symbol clock, wherein the second symbol corresponds to second data encoded in a second transition in signaling state of the 3-wire link that occurs between the second half-cycle of the symbol clock and the third half-cycle of the symbol clock;
providing a sequence of symbols by selecting between the first symbol and the second symbol in accordance with state of the symbol clock, wherein the first symbol immediately precedes the second symbol in the sequence of symbols; and
decoding data from the sequence of symbols.

15. The non-transitory processor-readable storage medium of claim 14, wherein the symbol clock is derived from transitions in signaling state of the difference signals.

16. The non-transitory processor-readable storage medium of claim 14, further comprising code for:
deriving the symbol clock from the difference signals, wherein the 3-wire link is operated in accordance with a C-PHY protocol.

17. The non-transitory processor-readable storage medium of claim 14, further comprising code for:
for each difference signal, providing a first signal representing the state of a corresponding difference signal in the first half-cycle of the symbol clock, a second signal representing the state of a corresponding difference signal in the second half-cycle of the symbol clock, and a third signal representing the state of a corresponding difference signal in the third half-cycle of the symbol clock.

18. The non-transitory processor-readable storage medium of claim 14, further comprising code for:
decoding a 16-bit word from each of a plurality of sequences of seven symbols.

19. The non-transitory processor-readable storage medium of claim 14, further comprising code for:
decoding a 32-bit word from each pair of sequences of seven symbols generated concurrently by a first wire state decoder and a second wire state decoder.

20. An apparatus comprising:
means for providing difference signals representative of differences in signaling state between each pair of wires in a 3-wire link;
means for generating symbols using the difference signals, including:
a first wire state decoder configured to generate a first symbol representative of differences between state of the difference signals in a first half-cycle of a symbol clock and state of the difference signals in a second half-cycle of the symbol clock that immediately precedes the first half-cycle in the symbol clock, wherein the first symbol corresponds to first data encoded in a first transition in signaling state of the 3-wire link that occurs between the first half-cycle of the symbol clock and the second half-cycle of the symbol clock; and
a second wire state decoder configured to generate a second symbol representative of differences between the state of the difference signals in the second half-cycle of the symbol clock and state of the difference signals in a third half-cycle of the symbol clock that immediately precedes the second half-cycle in the symbol clock wherein the second symbol corresponds to second data encoded in a second transition in signaling state of the 3-wire link that occurs between the second half-cycle of the symbol clock and the third half-cycle of the symbol clock;
means for providing a sequence of symbols by selecting between the first symbol and the second symbol in accordance with state of the symbol clock, wherein the first symbol immediately precedes the second symbol in the sequence of symbols; and
means for decoding data from the sequence of symbols.

* * * * *